United States Patent
Yamaoka et al.

(10) Patent No.: US 10,348,743 B2
(45) Date of Patent: Jul. 9, 2019

(54) IDENTIFICATION METHOD AND INFORMATION PROCESSING DEVICE

(71) Applicant: FUJITSU LIMITED, Kawasaki-shi, Kanagawa (JP)

(72) Inventors: Mebae Yamaoka, Kawasaki (JP); Takanori Oikawa, Kawasaki (JP); Kazuyoshi Furukawa, Kawasaki (JP); Masahiko Takenaka, Kawasaki (JP); Yuki Fujishima, Yokohama (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 208 days.

(21) Appl. No.: 15/193,264

(22) Filed: Jun. 27, 2016

(65) Prior Publication Data
US 2017/0070515 A1 Mar. 9, 2017

(30) Foreign Application Priority Data
Sep. 7, 2015 (JP) ................................. 2015-175575

(51) Int. Cl.
*H04L 29/06* (2006.01)
(52) U.S. Cl.
CPC ............................... *H04L 63/1416* (2013.01)
(58) Field of Classification Search
CPC ... C02F 1/32; C02F 1/325; B01J 35/02; B01J 37/0215; B01J 35/004; B01J 21/063
USPC ......................................................... 726/23
See application file for complete search history.

(56) References Cited

U.S. PATENT DOCUMENTS

| 9,645,759 B2* | 5/2017 | Fujishima ............. G06F 3/0643 |
| 2001/0014093 A1 | 8/2001 | Yoda et al. |
| 2013/0080625 A1* | 3/2013 | Morinaga ............. G06F 21/552 |
| | | 709/224 |

(Continued)

FOREIGN PATENT DOCUMENTS

| JP | 2001-217834 | 8/2001 |
| JP | 2003-032252 A | 1/2003 |

(Continued)

OTHER PUBLICATIONS

Japanese Office Action dated May 7, 2019, issued in corresponding Japanese Patent Application No. 2015-175575.

*Primary Examiner* — Michael Pyzocha
*Assistant Examiner* — Zoha Piyadehghibi Tafaghodi
(74) *Attorney, Agent, or Firm* — Xsensus LLP

(57) ABSTRACT

A method includes executing a determination process that determines that a setting value is a search key, the setting value being for an item from among a plurality of items in a record identified in a plurality of records, the plurality of records relating to a plurality of pieces of log information that are collected from a plurality of computers; executing a first identification process that identifies, as the record, another record including the search key from among the plurality of records; executing a second identification process that identifies, as the item, a new item from among the plurality of items, the new item being different from an item used to identify the another record in the executing of the first identification process; repeating executing of the processes; and outputting information on at least one computer that is suspected of a cyber-attack, based on the identified records.

15 Claims, 38 Drawing Sheets

(56) References Cited

U.S. PATENT DOCUMENTS

| | | | | |
|---|---|---|---|---|
| 2014/0115663 A1* | 4/2014 | Fujishima | ........... | H04L 63/1408 |
| | | | | 726/3 |
| 2014/0115705 A1* | 4/2014 | Fujishima | ............. | H04L 43/028 |
| | | | | 726/23 |
| 2016/0011909 A1* | 1/2016 | Nemoto | ................ | G06F 9/5044 |
| | | | | 718/104 |

FOREIGN PATENT DOCUMENTS

| JP | 2004-13553 | 1/2004 |
|---|---|---|
| JP | 2005-202664 | 7/2005 |
| JP | 2007-122749 | 5/2007 |
| JP | 2014-123996 A | 7/2014 |

\* cited by examiner

FIG. 11

| DATE/TIME | EVENT TYPE | ACCOUNT NAME | IDENTIFIER OF LOGON REQUEST SOURCE |
|---|---|---|---|
| ⋮ | ⋮ | ⋮ | ⋮ |
| T3 | LOGON | ACCOUNT M | COMPUTER C |
| ⋮ | ⋮ | ⋮ | ⋮ |
| T6 | LOGOFF | ACCOUNT M | NONE |
| ⋮ | ⋮ | ⋮ | ⋮ |

FIG. 13

| IDENTIFIER OF LOGON REQUEST SOURCE | USER ACCOUNT IN REMOTE LOGON | IDENTIFIER OF EXECUTION TOOL | EXECUTION DATE/TIME |
|---|---|---|---|
| ⋮ | ⋮ | ⋮ | ⋮ |
| COMPUTER C | ACCOUNT L | TOOL Q | T3 |
| ⋮ | ⋮ | ⋮ | ⋮ |
| COMPUTER C | ACCOUNT M | TOOL R | T5 |
| ⋮ | ⋮ | ⋮ | ⋮ |

FIG. 15

| IDENTIFIER OF ATTACKING TERMINAL | ABUSED USER ACCOUNT | IDENTIFIER OF ABUSED TOOL | IDENTIFIER OF TARGETED TERMINAL | EXECUTION DATE/TIME |
|---|---|---|---|---|
| COMPUTER A | ACCOUNT L | TOOL Q | COMPUTER E | T1 |
| COMPUTER B | ACCOUNT L | TOOL Q | COMPUTER F | T2 |
| COMPUTER C | ACCOUNT L | TOOL Q | COMPUTER G | T4 |
| COMPUTER C | ACCOUNT M | TOOL R | COMPUTER G | T6 |
| COMPUTER D | ACCOUNT M | TOOL S | COMPUTER H | T7 |
| COMPUTER D | ACCOUNT N | TOOL S | COMPUTER I | T8 |

FIG. 16

| FIRST SEARCH KEY (IDENTIFIER OF ATTACKING TERMINAL) | NEW FLAG | EFFECTIVE FLAG |
|---|---|---|
| COMPUTER A | OFF | OFF |
| COMPUTER B | OFF | OFF |
| COMPUTER C | OFF | OFF |
| COMPUTER D | OFF | OFF |

FIG. 17

| SECOND SEARCH KEY (ABUSED USER ACCOUNT) | NEW FLAG | EFFECTIVE FLAG |
|---|---|---|
| ACCOUNT L | OFF | OFF |
| ACCOUNT M | OFF | OFF |
| ACCOUNT N | OFF | OFF |

FIG. 18

| THIRD SEARCH KEY (IDENTIFIER OF ABUSED TOOL) | NEW FLAG | EFFECTIVE FLAG |
|---|---|---|
| TOOL Q | OFF | OFF |
| TOOL R | OFF | OFF |
| TOOL S | OFF | OFF |

FIG. 25

| TRANSMISSION SOURCE IP ADDRESS | ACCOUNT NAME | TASK PATH | DESTINATION IP ADDRESS | REGISTRATION DATE/TIME |
|---|---|---|---|---|
| ⋮ | ⋮ | ⋮ | ⋮ | ⋮ |
| x.x.x.1 | adminL | c:qware.exe | x.x.x.5 | T11 |
| ⋮ | ⋮ | ⋮ | ⋮ | ⋮ |
| x.x.x.2 | adminL | c:qware.exe | x.x.x.6 | T12 |
| ⋮ | ⋮ | ⋮ | ⋮ | ⋮ |
| x.x.x.3 | adminL | c:qware.exe | x.x.x.7 | T13 |

FIG. 28

| IDENTIFIER OF ATTACKING TERMINAL | ABUSED USER ACCOUNT | IDENTIFIER OF ABUSED TASK | IDENTIFIER OF TARGETED TERMINAL | REGISTRATION DATE/TIME |
|---|---|---|---|---|
| x.x.x.1 | adminL | qware.exe | x.x.x.5 | T11 |
| x.x.x.2 | adminL | qware.exe | x.x.x.6 | T12 |
| x.x.x.3 | adminL | qware.exe | x.x.x.7 | T13 |

FIG. 32

| TRANSMISSION SOURCE IP ADDRESS | ACCOUNT NAME | SERVICE NAME | DESTINATION IP ADDRESS | REGISTRATION DATE/TIME |
|---|---|---|---|---|
| ⋮ | ⋮ | ⋮ | ⋮ | ⋮ |
| x.x.x.3 | userM | serviceR | x.x.x.7 | T21 |
| ⋮ | ⋮ | ⋮ | ⋮ | ⋮ |
| x.x.x.4 | userM | serviceS | x.x.x.8 | T22 |
| ⋮ | ⋮ | ⋮ | ⋮ | ⋮ |
| x.x.x.4 | userN | serviceS | x.x.x.9 | T23 |

FIG. 34

| IDENTIFIER OF ATTACKING TERMINAL | ABUSED USER ACCOUNT | IDENTIFIER OF ABUSED SERVICE | IDENTIFIER OF TARGETED TERMINAL | REGISTRATION DATE/TIME |
|---|---|---|---|---|
| x.x.x.3 | userM | serviceR | x.x.x.7 | T21 |
| x.x.x.4 | userM | serviceS | x.x.x.8 | T22 |
| x.x.x.4 | userN | serviceS | x.x.x.9 | T23 |

IDENTIFICATION METHOD AND INFORMATION PROCESSING DEVICE

CROSS-REFERENCE TO RELATED APPLICATION

This application is based upon and claims the benefit of priority of the prior Japanese Patent Application No. 2015-175575, filed on Sep. 7, 2015, the entire contents of which are incorporated herein by reference.

FIELD

The embodiments discussed herein are related to a security technique against a cyber-attack.

BACKGROUND

In the case where a remote administration tool (RAT) aiming at a targeted attack invades an information processing system, there occurs a risk that confidential data may be leaked, for example.

Against this risk, there is a technique of monitoring predetermined actions taken by the RAT. If this technique makes it possible to detect a computer infected with the RAT and to acquire a trace of attacks made by the infected computer, a part of an invaded range may be known.

Related techniques are disclosed in, for example, Japanese Laid-open Patent Publication Nos. 2005-202664, 2004-13553, 2007-122749, and 2001-217834.

SUMMARY

According to an aspect of the invention, an identification method includes executing a determination process that determines that a setting value is a search key, the setting value being for an item from among a plurality of items in a record identified in a plurality of records, the plurality of records relating to a plurality of pieces of log information that are collected from a plurality of computers, and each of the plurality of records having the plurality of items and a plurality of setting values for the respective items; executing a first identification process that identifies, as the record, another record including the search key from among the plurality of records; executing a second identification process that identifies, as the item, a new item from among the plurality of items, the new item being different from an item used to identify the another record in the executing of the first identification process; repeating the executing of the determination process, the executing of the first identification process, and the executing of the second identification process; and outputting information on at least one computer, from among the plurality of computers, that is suspected of a cyber-attack, based on records identified by the repeating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of an event log;

FIG. 13 is a diagram illustrating an example of a tool execution log;

FIG. 15 is a diagram illustrating an example of an attacking trace table;

FIG. 16 is a diagram illustrating an example of a first key table;

FIG. 17 is a diagram illustrating an example of a second key table;

FIG. 18 is a diagram illustrating an example of a third key table;

FIG. 25 is a diagram illustrating an example of a task registration log;

FIG. 28 is a diagram illustrating an example of an attacking trace table in the second embodiment;

FIG. 32 is a diagram illustrating an example of a service registration log;

FIG. 34 is a diagram illustrating an example of an attacking trace table according to a third embodiment;

DESCRIPTION OF EMBODIMENTS

As for the monitoring technique mentioned above, however, there may be a case where another RAT overlooked by the technique is present. Moreover, in another possible case, the actual invaded range is wider than the range that an administrator presumes.

The administrator has to check a large amount of logs in order to identify the invaded range, so that the burden imposed on the administrator is so large.

An aspect of the technique disclosed in the embodiments is to narrow down logs to be checked to analyze a damage caused by a cyber-attack.

First Embodiment

Figure 1:
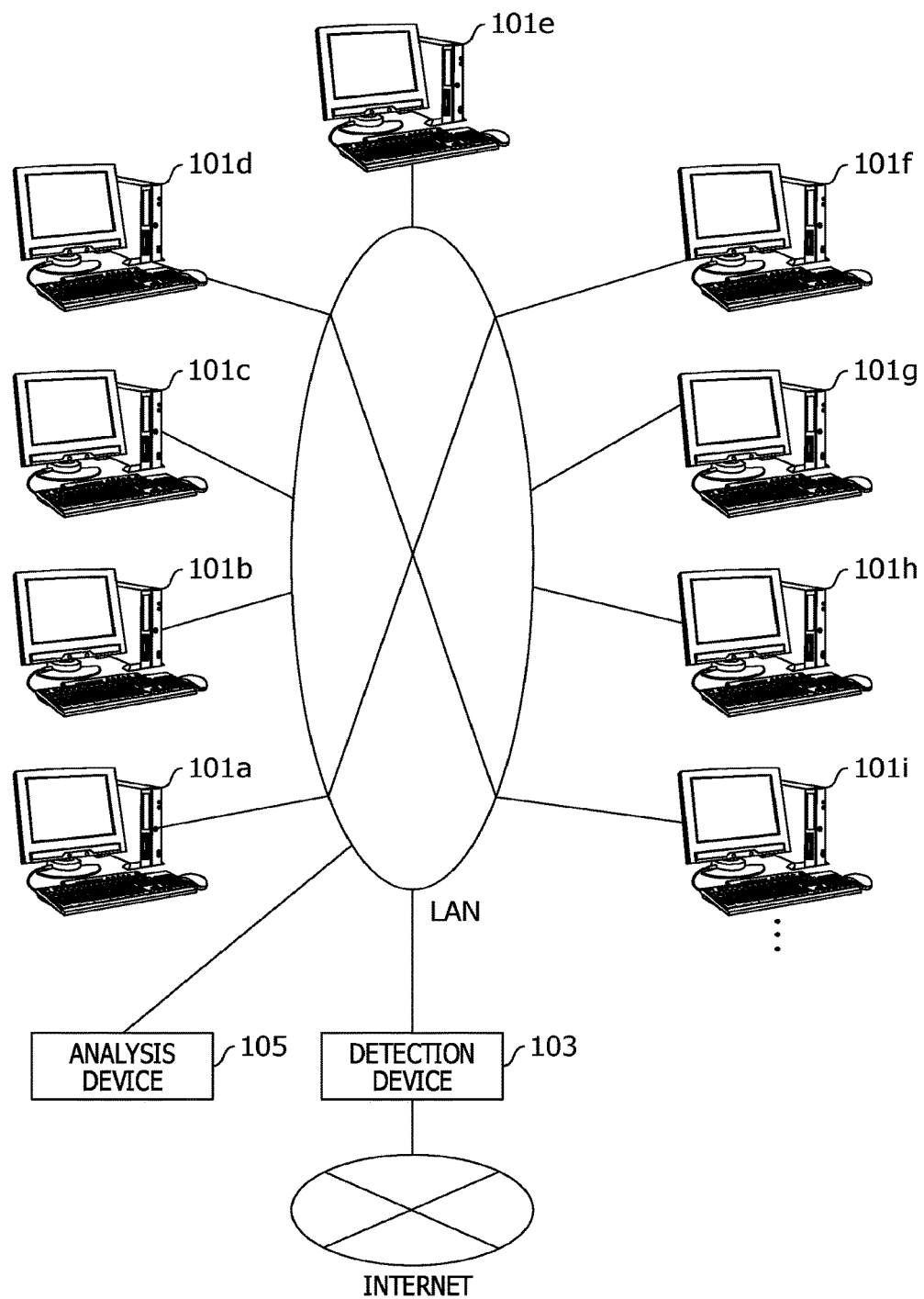
FIG. 1 is a diagram illustrating an example of an information processing system.

FIG. 1 illustrates an example of an information processing system. Multiple terminals 101 are connected to one another via a local area network (LAN). The LAN is connected to the Internet via a detection device 103. It is assumed that the terminals 101 may arbitrarily perform remote operations with one another under a predetermined condition. The detection device 103 searches malware that is hidden in the terminals 101 within the LAN, and identifies the terminal 101 infected with the malware.

The malware is, for example, an RAT that performs a targeted attack. The malware is fed via a targeted mail or an illegal site to the terminal 101 within the information processing system. The fed malware performs an illegal remote operation in response to reception of an instruction from an attacker outside the information processing system. Hereinafter, the terminal 101 invaded by such malware is referred to as an attack-side terminal 101 or an attacking terminal.

A certain kind of a cyber-attack controls multiple attacking terminals and thereby performs multi-staged illegal remote operations in the terminals 101 within the LAN. Hereinafter, the terminal 101 subjected to the illegal remote operation is referred to as a target-side terminal 101 or a targeted terminal.

Even if the detection device 103 finds out the attack-side terminal 101, it is difficult to know what remote operations the attack-side terminal 101 thus found performs on each of the other terminals 101. Moreover, malware of a type that the detection device 103 is unable to detect may be hidden in another terminal 101 in some cases.

In the present embodiment, after an attacking terminal is found using the detection device 103, an analysis device 105 collects logs accumulated in each of the terminals 101 within the LAN, and extracts a trace of an operation which may possibly be part of attacks (hereinafter, referred to as attacking trace).

Figure 2:
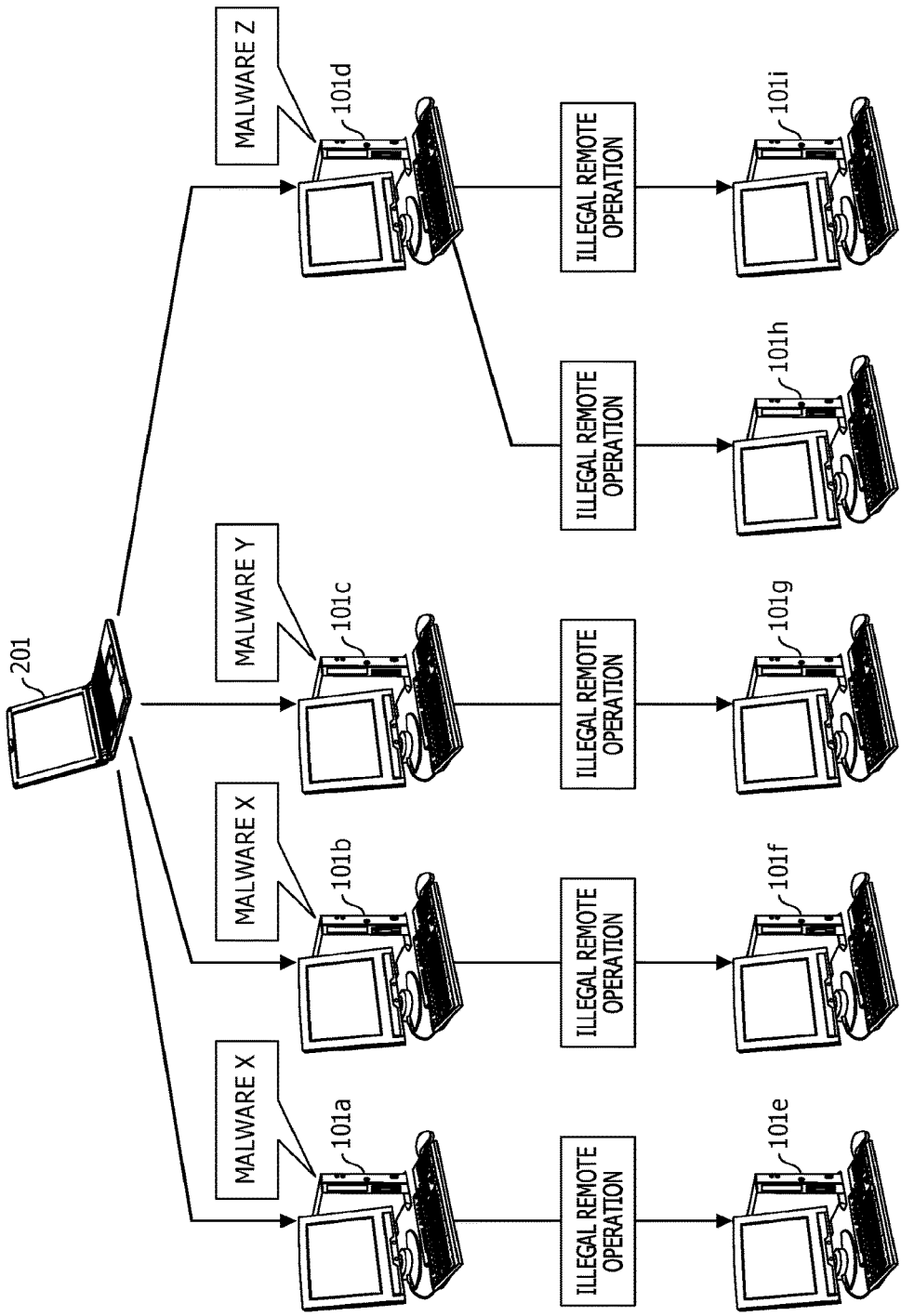
FIG. 2 is a diagram illustrating an example of a cyber-attack.

FIG. 2 illustrates an example of cyber-attacks. In this example, a terminal 101a is infected with malware X. Similarly, a terminal 101b is infected with the malware X. Similarly, a terminal 101c is infected with malware Y. Similarly, a terminal 101d is infected with malware Z.

The malware that is operated by an attacker terminal 201 performs illegal remote operations on other terminals 101.

In this example, the malware X in the terminal 101a illegally operates a terminal 101e. Similarly, the malware X in the terminal 101b illegally operates a terminal 101f. Similarly, the malware Y in the terminal 101c illegally operates a terminal 101g. Similarly, the malware Z in the terminal 101d illegally operates a terminal 101h and a terminal 101i.

When the detection device 103 detects the attack-side terminal 101a, it is comparatively easy to identify the target-side terminal 101e illegally operated by the terminal 101a. In this case, the attack-side terminal 101b infected with the same malware X as the terminal 101a is also similarly detected. Accordingly, the target-side terminal 101f illegally operated by the terminal 101b is also easy to identify.

However, it is difficult to detect the attack-side terminal 101c and the attack-side terminal 101d infected with the malware of respectively different types from the malware X. If these attack-side terminal 101c and terminal 101d are not detected, it is impossible to identify the target-side terminal 101g that is illegally operated by the terminal 101c, and the target-side terminal 101h and the target-side terminal 101i that are illegally operated by the terminal 101d.

In general, an attacker repeatedly uses the same attacking terminal in an attacking procedure. Moreover, the attacker may repeatedly use the same account name through the attacking procedure in some cases. The attacker may also remotely operate the same tool through the attacking procedure in some cases.

In other words, there is a possibility that another remote operation performed by the attack-side terminal 101 determined based on an attacking trace may be as part of cyber-attacks. Moreover, there is a possibility that another remote operation using the account name included in the attacking trace may be also illegal. In addition, a tool that is determined to have a possibility of being illegally used based on the attacking trace may be used also in another terminal 101 for an illegal purpose.

Figure 3:
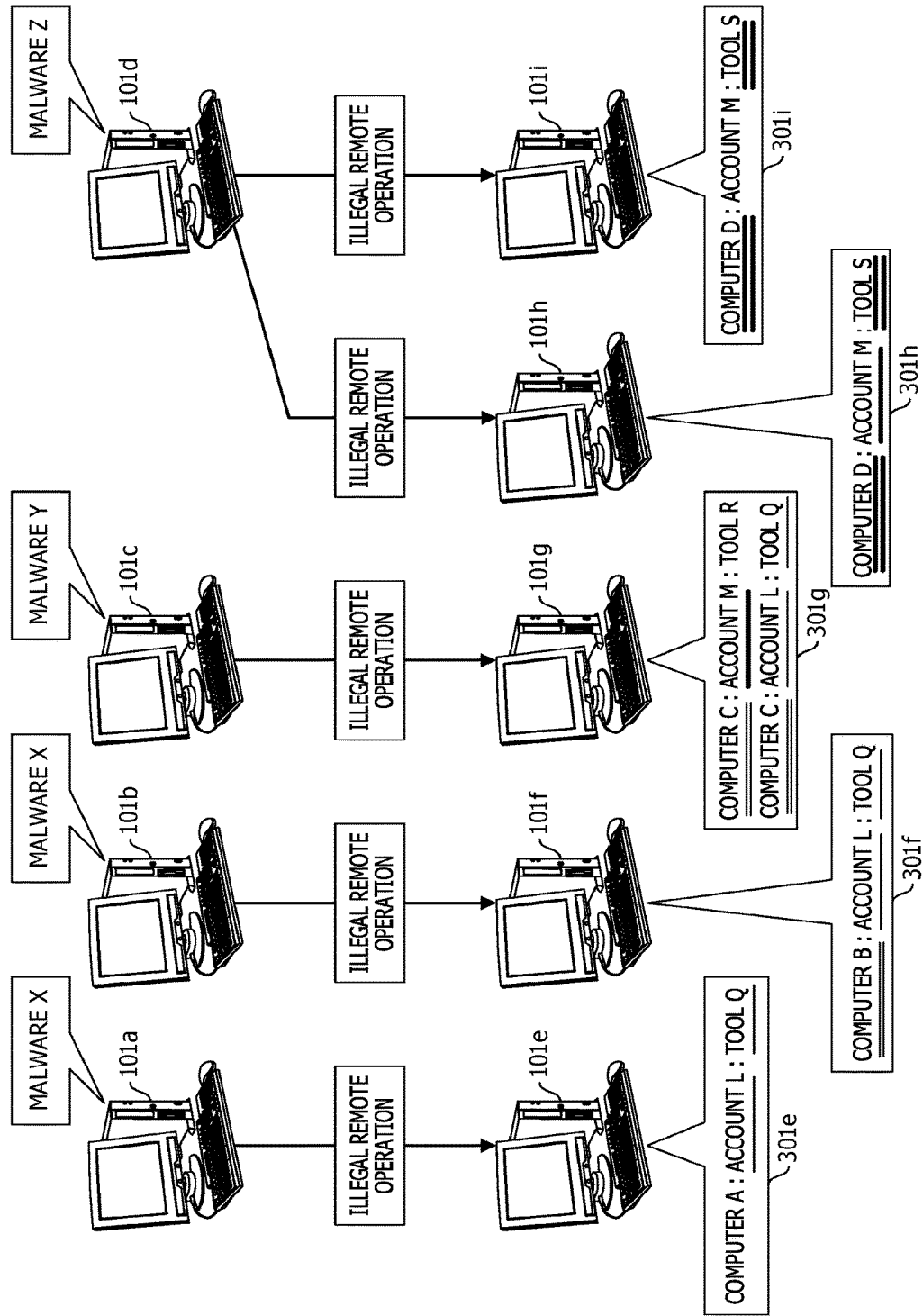
FIG. 3 is a diagram illustrating an example of tool execution logs according to a present embodiment.

FIG. 3 illustrates an example of tool execution logs 301 in the present embodiment. Each terminal 101 generates the tool execution log 301. When a program (hereinafter, referred to as a tool) is executed by a remote operation, a logon request source, a user account, and an execution tool are recorded in the tool execution log 301. Further, the tool is, for example, a program that performs a remote operation for the purpose of system management. Moreover, malware may operate as a tool in some cases.

The logon request source is the terminal 101 that requests a remote logon as a precondition to perform a remote operation. The user account is used when the remote operation is performed.

As illustrated in FIG. 3, a tool execution log 301e in the terminal 101e includes records of "COMPUTER A" as the logon request source, "ACCOUNT L" as the user account, and "TOOL Q" as the execution tool.

Similarly, a tool execution log 301f in the terminal 101f includes records of "COMPUTER B" as the logon request source, "ACCOUNT L" as the user account, and "TOOL Q" as the execution tool.

Similarly, a tool execution log 301g in the terminal 101g includes records of "COMPUTER C" as the logon request source, "ACCOUNT M" as the user account, and "TOOL R" as the execution tool. The tool execution log 301g further includes records of "COMPUTER C" as the logon request source, "ACCOUNT L" as the user account, and "TOOL Q" as the execution tool.

Similarly, a tool execution log 301*h* in the terminal 101*h* includes records of "COMPUTER D" as the logon request source, "ACCOUNT M" as the user account, and "TOOL S" as the execution tool.

Similarly, a tool execution log 301*i* in the terminal 101*i* includes records of "COMPUTER D" as the logon request source, "ACCOUNT N" as the user account, and "TOOL S" as the execution tool.

Note that, "COMPUTER A" to "COMPUTER I" respectively correspond to the terminal 101*a* to the terminal 101*i*.

Firstly, "COMPUTER A" corresponding to the attack-side terminal 101 is assumed to be a primary search key. Next, "ACCOUNT L" and "TOOL Q" corresponding to the primary search keys are secondary search keys (denoted with thin underline in FIG. 3). Similarly, "COMPUTER B" and "COMPUTER C" corresponding to the secondary search keys are tertiary search keys (denoted with thin double underline in FIG. 3). Similarly, "ACCOUNT M" corresponding to the tertiary search key is a quaternary search key (denoted with thick underline in FIG. 3). Further, "COMPUTER D" and "TOOL S" corresponding to the quaternary search keys are quinary search keys (denoted with thick double underline in FIG. 3). Hereinafter, an overview of an analysis using these search keys will be described.

Figure 4:
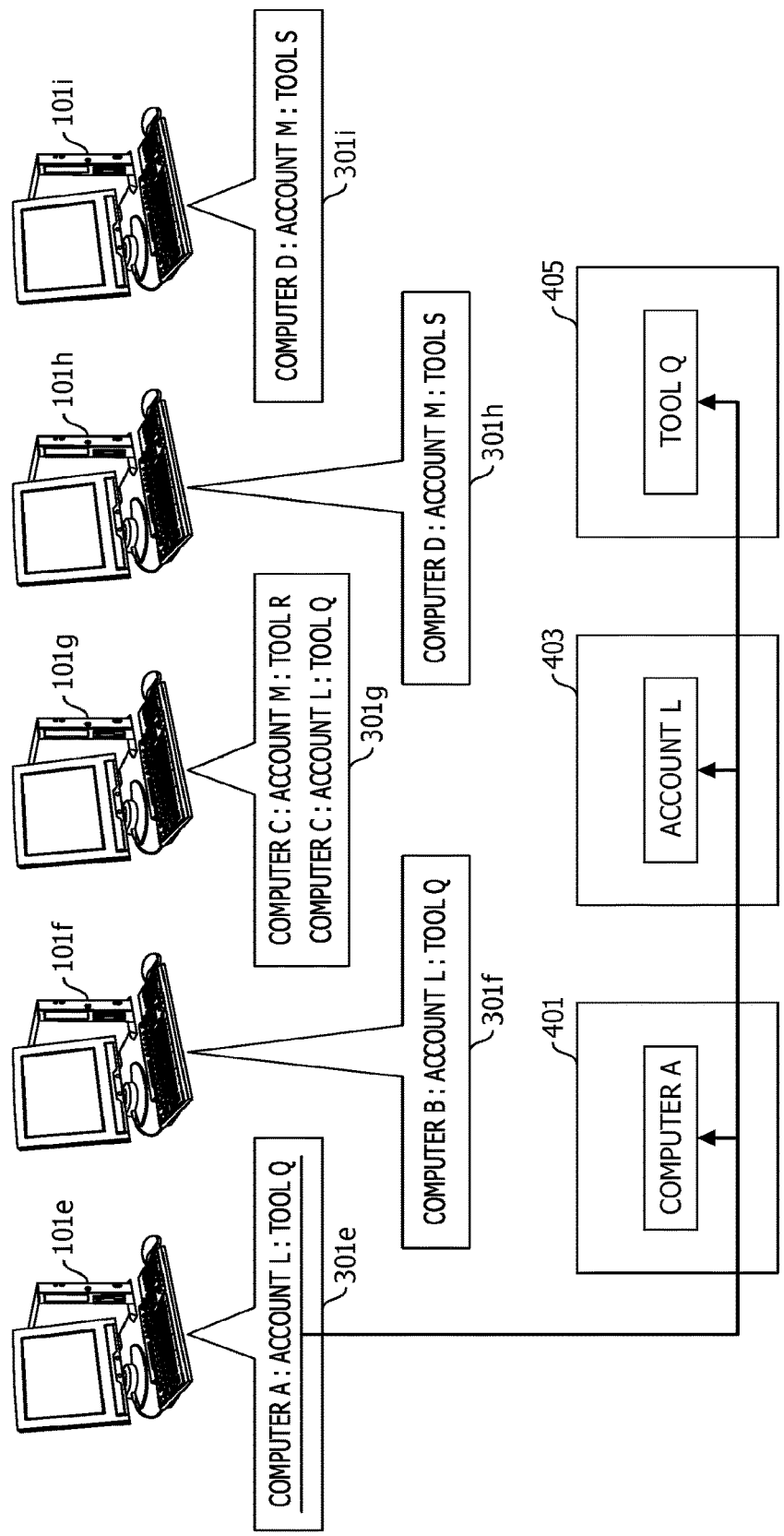
FIG. 4 is a diagram illustrating an analysis example in the present embodiment.

FIG. 4 illustrates an analysis example in the present embodiment. In the present embodiment, search keys are managed in a first key table 401, a second key table 403, and a third key table 405. The first key table 401 manages a search key (hereinafter, referred to as first search key) indicating a logon request source. The second key table 403 manages a search key (hereinafter, referred to as second search key) indicating a user account. The third key table 405 manages a search key (hereinafter, referred to as third search key) indicating an execution tool. Note that, the third search key relates to a task and a service, respectively, in later-described embodiments.

When it is determined that "COMPUTER A" matches the attack-side terminal 101, a record including "COMPUTER A" is identified in the tool execution log 301*e* by a first-time search operation. Further, "COMPUTER A" is extracted as a first search key from this record, and is registered in the first key table 401. Similarly, "ACCOUNT L" is extracted as a second search key, and is registered in the second key table 403. Similarly, "TOOL Q" is extracted as a third search key, and is registered in the third key table 405.

Figure 5:
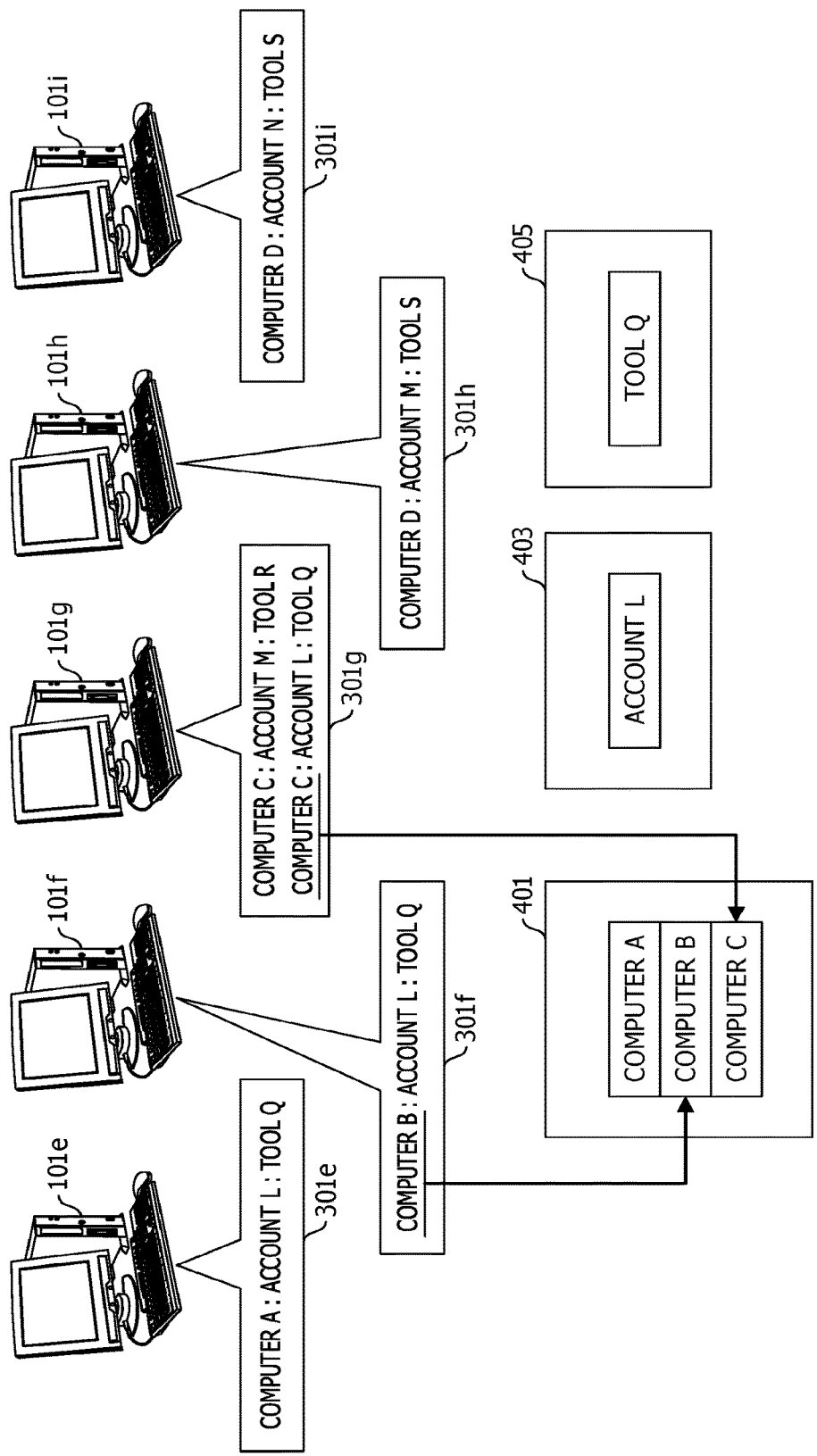
FIG. 5 is a diagram illustrating another analysis example in the present embodiment.

Next, a record including "ACCOUNT L" and "TOOL Q" and a record including "ACCOUNT L" and "TOOL Q" are respectively identified in the tool execution log 301*f* and in the tool execution log 301*g*, by a second-time search operation based on the new search keys "ACCOUNT L" and "TOOL Q" as illustrated FIG. 5. Herein, an explanation will be made excluding already searched records. Note that, a search target is a record including at least one search key. Further, "COMPUTER B" and "COMPUTER C" are extracted as first search keys from these records, and are registered in the first key table 401.

Figure 6:
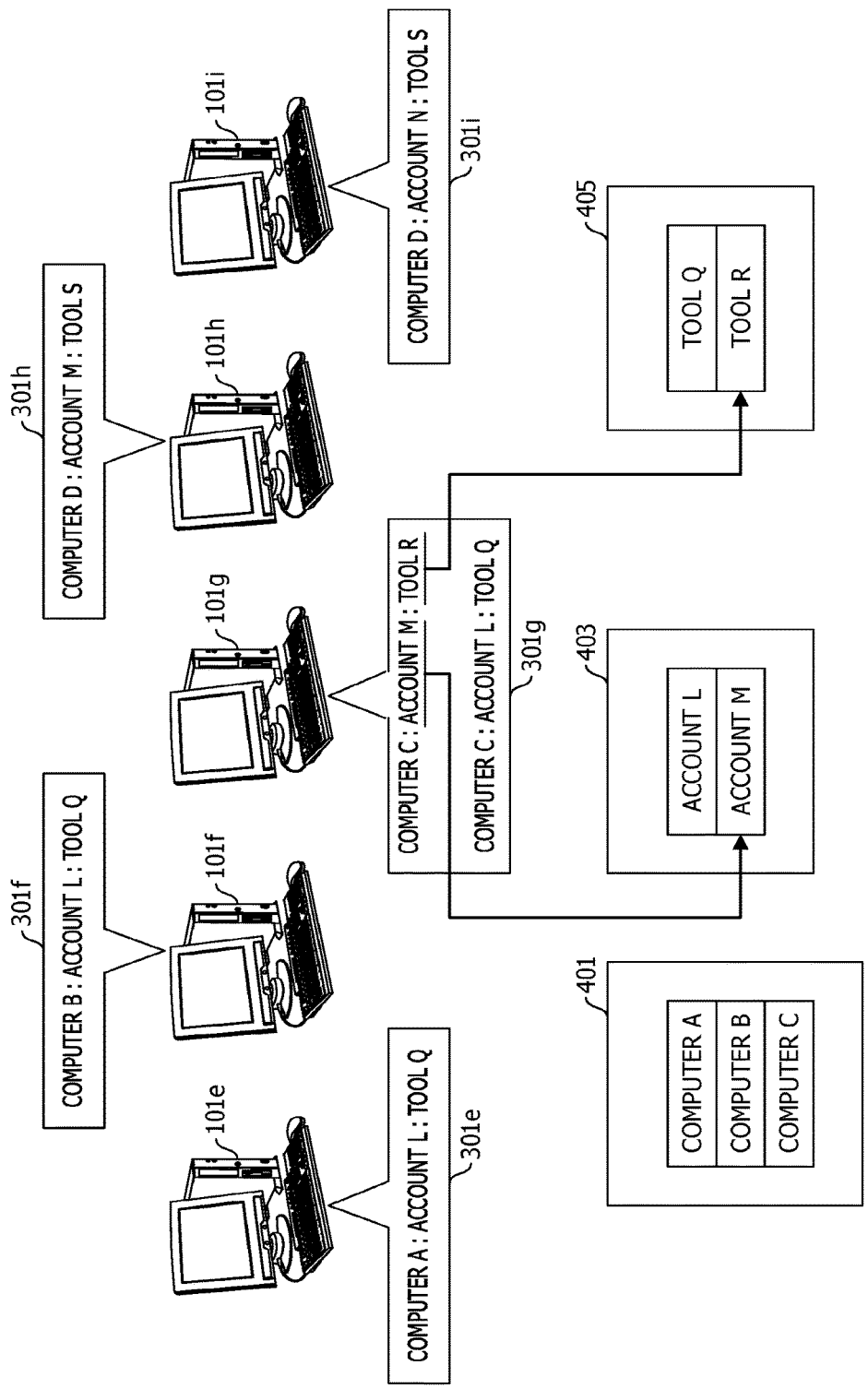
FIG. 6 is a diagram illustrating still another analysis example in the present embodiment.

Next, a record including "COMPUTER C" is identified in the tool execution log 301*g* by a third-time search operation as illustrated FIG. 6 based on the new search keys "COMPUTER B" and "COMPUTER C". Further, "ACCOUNT M" is extracted as a second search key from this record, and is registered in the second key table 403. In addition, "TOOL R" is extracted as a third search key, and is registered in the third key table 405.

Figure 7:
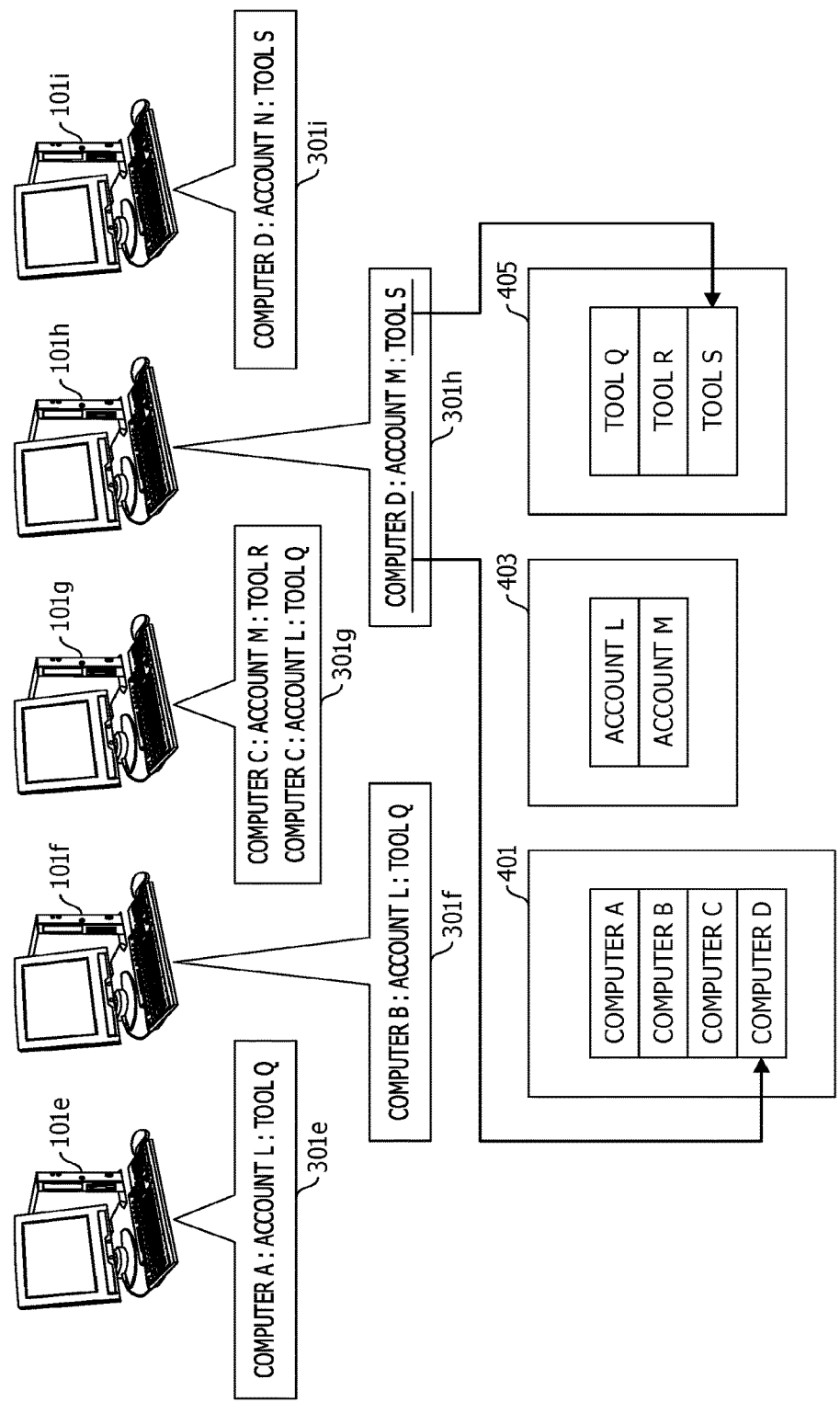
FIG. 7 is a diagram illustrating still another analysis example in the present embodiment.

Next, a record including "ACCOUNT M" is identified in the tool execution log 301*h* by a fourth-time search operation based on the new search keys "ACCOUNT M" and "TOOL R" as illustrated in FIG. 7. Further, "COMPUTER D" is extracted as a first search key from this record, and is registered in the first key table 401. In addition, "TOOL S" is extracted as a third search key, and is registered in the third key table 405.

Figure 8:
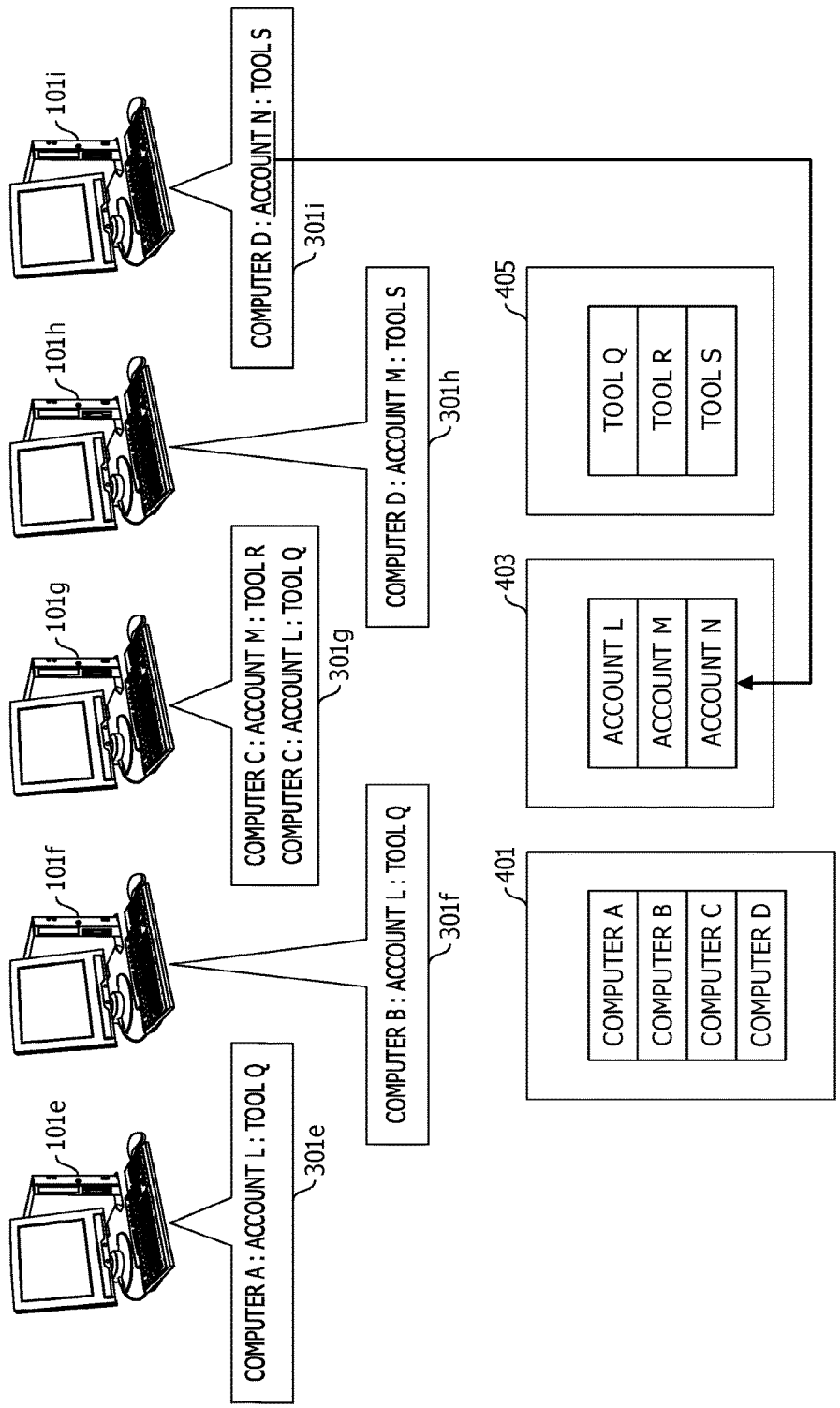
FIG. 8 is a diagram illustrating still another analysis example in the present embodiment.

Next, a record including "TOOL S" is identified in the tool execution log 301*i* by a fifth-time search operation based on the new search key "TOOL S" as illustrated in FIG. 8. Further, "ACCOUNT N" is extracted as a second search key from this record, and is registered in the second key table 403. In this example, no search key is registered in an overlapping manner.

Further, the search operation is repeated until the new search key is found no longer. In the foregoing, the explanation of the overview in the present embodiment is ended.

Figure 9:
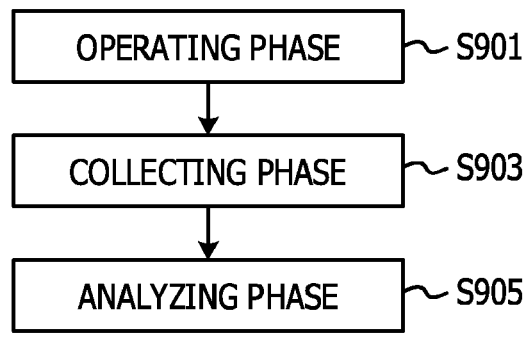
FIG. 9 is a diagram illustrating phases in the present embodiment.

FIG. 9 illustrates phases in the present embodiment. In an operating phase (S901) in which the information processing system is utilized on a routine basis, the terminal 101 accumulates logs (for example, the tool execution log 301). Moreover, the detection device 103 performs an operation of searching the attack-side terminal 101. Note that, in the operating phase, the analysis device 105 may not request to be connected to the LAN.

When the detection device 103 identifies the attack-side terminal 101, the phase is moved to a collecting phase (S903). In the collecting phase, the analysis device 105 collects a log from each terminal 101. The analysis device 105 may preferably automatically collect a log upon reception of a notification from the detection device 103. Alternatively, at the time when an administrator knows that the detection device 103 identifies the attack-side terminal 101, the administrator may preferably instruct the analysis device 105 to collect a log.

In an analyzing phase (S905), the analysis device 105 performs the above-mentioned searches to extract attacking traces from the collected logs.

Figure 10:
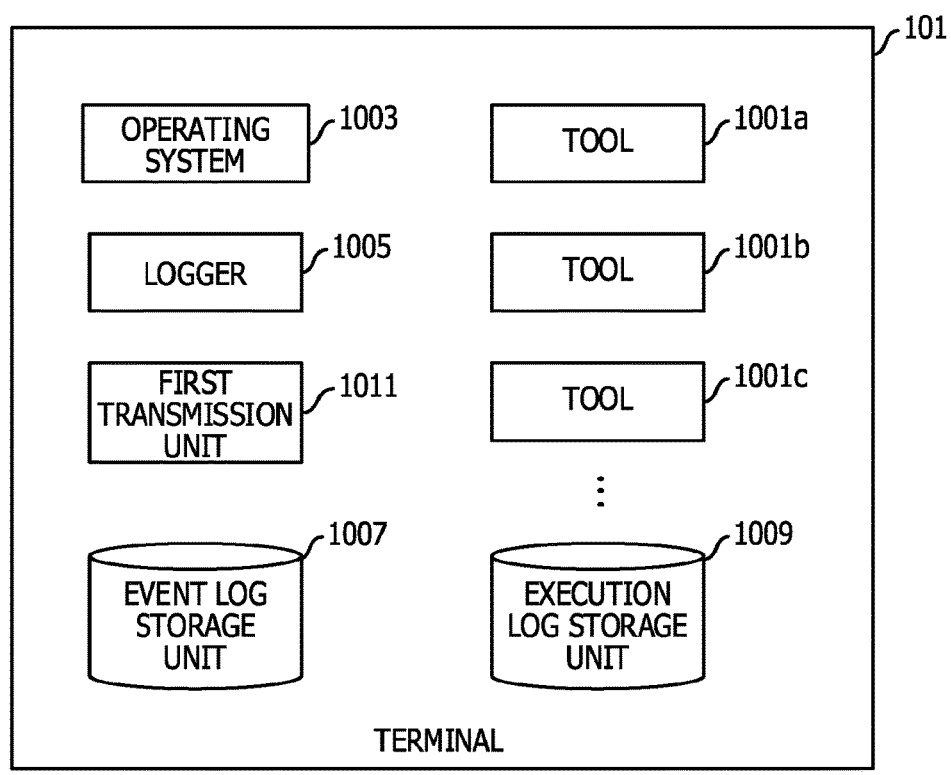
FIG. 10 is a diagram illustrating a module configuration example of a terminal.

Next, the terminal 101 will be described. FIG. 10 illustrates a module configuration example of the terminal 101. The terminal 101 includes tools 1001*a* to 1001*c*, an operating system 1003, a logger 1005, an event log storage unit 1007, an execution log storage unit 1009, and a first transmission unit 1011.

Each tool 1001 operates by a remote operation. The operating system 1003 manages, for example, a start-up process. The logger 1005 executes a logging process (A) related to an event in the terminal 101. The event log storage unit 1007 stores therein an event log. The execution log storage unit 1009 stores therein the tool execution log 301. The first transmission unit 1011 transmits the event log and the tool execution log 301 to the analysis device 105.

The above-mentioned first transmission unit 1011 is implemented using a hardware resource (for example, FIG. 38), and a program that causes a processor to execute a process described below.

Figure 38:
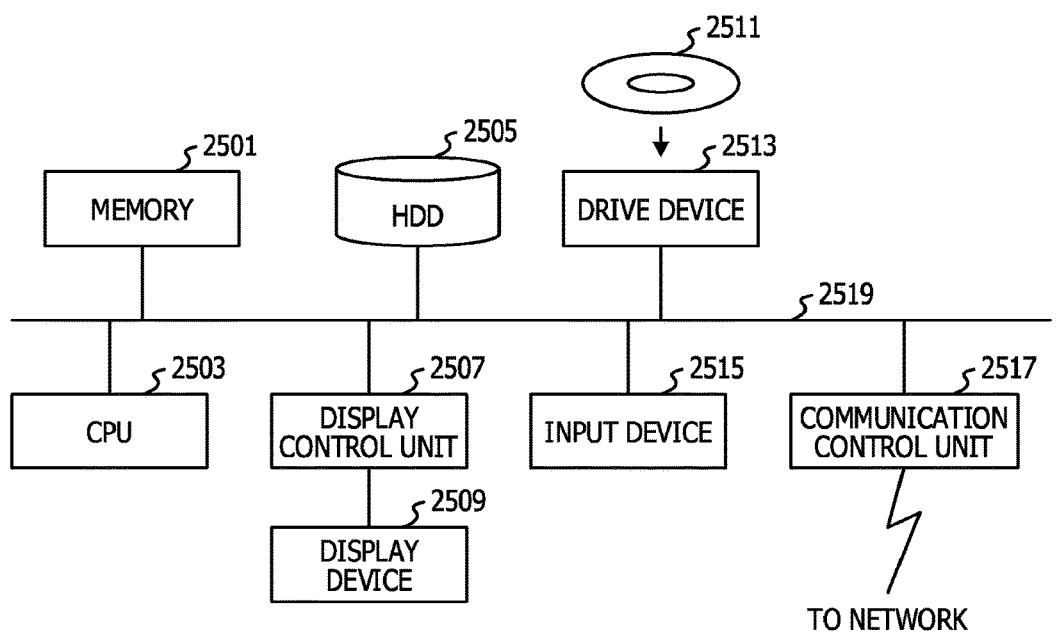
FIG. 38 is a function block diagram of a computer.

The event log storage unit 1007 and the execution log storage unit 1009 described above are implemented using the hardware resource (for example, FIG. 38).

FIG. 11 illustrates an example of an event log. The event log in this example has a table form. Note that, the event log may preferably have a form other than the table form. The event log in this example includes a record (hereinafter, referred to as event record) corresponding to an event that occurs in the terminal 101. The event record includes a field in which date/time is set, a field in which an event type is set, a field in which an account name is set, and a field in which an identifier of a logon request source is set.

The date/time is date and time at which the event occurs in the terminal 101. In this example, for simple explanation, the date/time is denoted with a numeric character for identification instead of a specific date/time, and is described, such as "T3". This applies to other examples of data. The event type is a type of the event that occurs in the terminal 101. This example focuses on an event record with the event type of "LOGON". The event record with the event type of "LOGON" indicates that a remote logon from another terminal 101 is performed.

When the event type is "LOGON", the account name identifies a user account that is used in the remote logon. In this example, for simple explanation, the account name is denoted with a character for identification instead of a specific account name, and is described, such as "ACCOUNT M". This applies to other examples of data.

When the event type is "LOGON", the identifier of the logon request source identifies the terminal 101 that requests the remote logon. In this example, for simple explanation, the identifier of the logon request source is denoted with a character for identification instead of an identifier of the specific terminal 101, and is described, such as "COMPUTER C". This applies to other examples of data. Further, the identifier of the terminal 101 is, for example, an Internet protocol (IP) address or a host name.

The illustrated event log is generated in the terminal 101g that is "COMPUTER G". A first event record illustrated indicates that the terminal 101c that is "COMPUTER C" performs a remote logon to the terminal 101g that is "COMPUTER G", using the account name of "ACCOUNT M", on the date/time "T3". Note that, the generation of event logs falls into the related art, and thus an explanation thereof is omitted.

Figure 12:
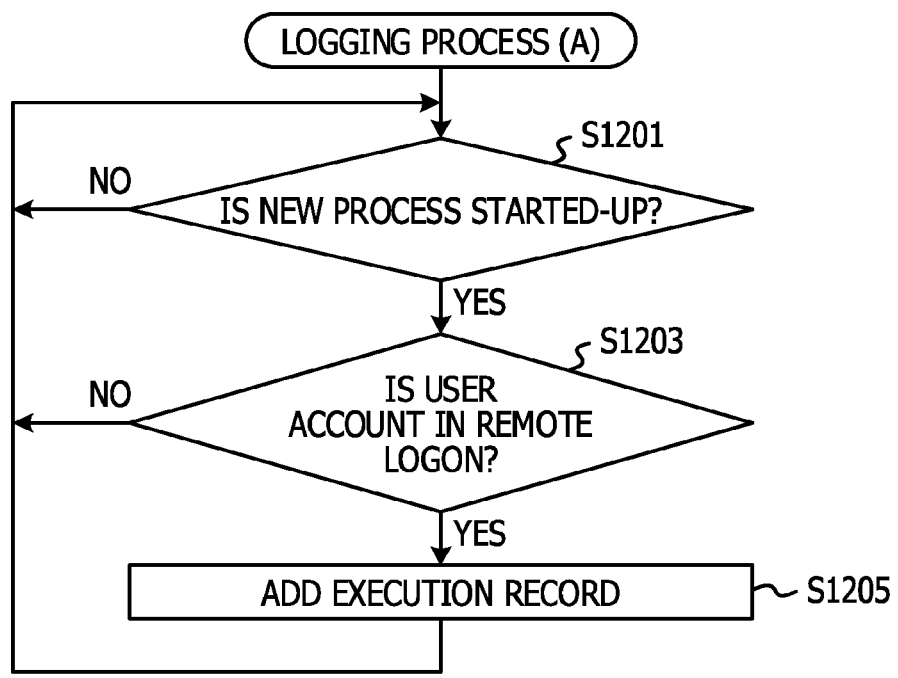
FIG. 12 is a flowchart illustrating a flow of a logging process (A)

Subsequently, the logging process (A) by the logger 1005 will be described. In the logging process (A), the tool execution log 301 is generated. FIG. 12 illustrates a flow of the logging process (A). The logger 1005 determines whether a new process is started-up (S1201). If determining that no new process is started-up, the logger 1005 repeats the processing illustrated at S1201.

If determining that a new process is started-up, the logger 1005 determines whether an user account by which the new process is started-up is a user account in the remote logon (S1203). Specifically, the logger 1005 makes a determination based on an account name set in an event record with the event type of "LOGON".

If determining that an user account by which the new process is started-up is not a user account in the remote logon, the logger 1005 returns the process to the processing illustrated at S1201, and repeats the above-mentioned processing.

If determining that an user account by which the new process is started-up is a user account in the remote logon, the logger 1005 adds a new record to the tool execution log 301 (S1205).

Herein, the tool execution log 301 will be described anew. FIG. 13 illustrates an example of the tool execution log 301. The tool execution log 301 in this example has a table form. Note that, the tool execution log 301 may preferably have a form other than the table form. The tool execution log 301 in this example includes a record (hereinafter, referred to as execution record) corresponding to execution of the tool 1001. The execution record includes a field in which an identifier of a logon request source is set, a field in which a user account in a remote logon is set, a field in which an identifier of an execution tool is set, and a field in which execution date/time is set.

The identifier of the logon request source identifies a terminal 101 that requests a remote logon as a precondition to perform a remote operation for execution of a tool. The user account in the remote logon is a user account by which the remote operation is performed.

The identifier of the execution tool identifies the tool 1001 that is executed by the remote operation. In this example, for simple explanation, the identifier of the execution tool is denoted with a character for identification instead of an identifier of a specific tool, and is described, such as "TOOL Q". This applies to other examples of data. The execution date/time is the date and time when the tool 1001 is executed by the remote operation.

The illustrated event log is generated in the terminal 101g that is "COMPUTER G". an illustrated first event record indicates that a user that has made a remote logon using "ACCOUNT L" from "COMPUTER C" executes "TOOL Q" of the terminal 101g that is "COMPUTER G", on the date/time "T3". Similarly, an illustrated second event record indicates that a user that has made a remote logon using "ACCOUNT M" from "COMPUTER C" executes "TOOL R" of the terminal 101g that is "COMPUTER G", on the date/time "T5".

In this example, it is assumed that a record is made in the tool execution log 301 only when the tool 1001 is executed by the remote operation.

The description returns to the explanation for FIG. 12. At S1205, the logger 1005 sets, in an event record with the event type of "LOGON", an identifier of a logon request source in association with a user account, to a new execution record. In addition, the logger 1005 sets the user account to the new execution record. In addition, the logger 1005 sets a name of the new process as the identifier of the execution tool to the new execution record. In addition, the logger 1005 sets a date/time when the new process is started-up to the field of the execution date/time in the new execution record. Further, the logger 1005 returns the process to the processing illustrated at S1201, and repeats the above-mentioned processing.

Figure 14:
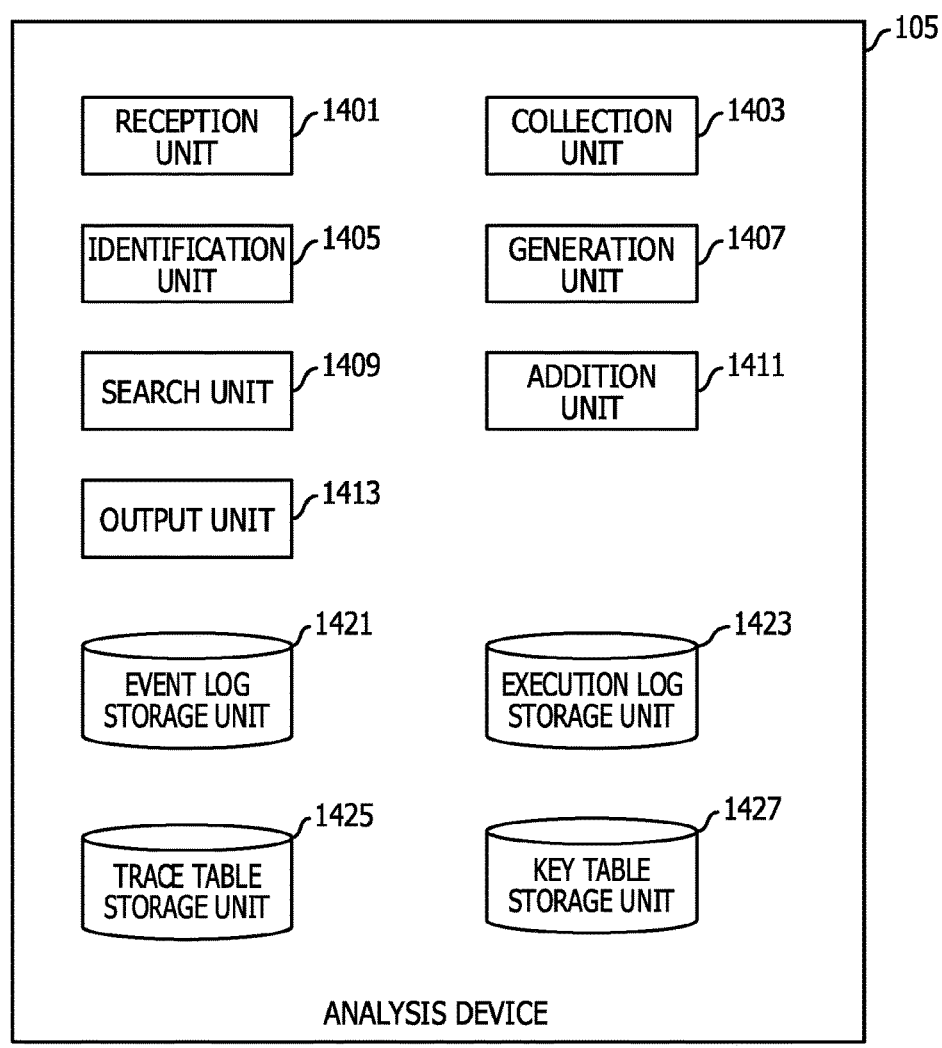
FIG. 14 is a diagram illustrating a module configuration example of an analysis device.

FIG. 14 illustrates a module configuration example of the analysis device 105. The analysis device 105 includes a reception unit 1401, a collection unit 1403, an identification unit 1405, a generation unit 1407, a search unit 1409, an addition unit 1411, an output unit 1413, an event log storage unit 1421, an execution log storage unit 1423, a trace table storage unit 1425, and a key table storage unit 1427.

The reception unit 1401 receives an identifier of an attacking terminal. The collection unit 1403 collects an event log and the tool execution log 301. The identification unit 1405 executes an identification process. The generation unit 1407 generates a search key table. The search unit 1409 searches attacking traces. The addition unit 1411 adds a search key to the search key table. The output unit 1413 executes an output process.

The event log storage unit 1421 stores therein the collected event log. The execution log storage unit 1423 stores therein the collected tool execution log 301. The trace table storage unit 1425 stores therein an attacking trace table. The attacking trace table will be described later with reference to FIG. 15. The key table storage unit 1427 stores therein search key tables (in this example, the first key table 401, the second key table 403, and the third key table 405).

The reception unit 1401, the collection unit 1403, the identification unit 1405, the generation unit 1407, the search unit 1409, the addition unit 1411, and the output unit 1413 mentioned above are implemented using the hardware resource (for example, FIG. 38), and a program that causes the processor to execute a process described below.

The event log storage unit 1421, the execution log storage unit 1423, the trace table storage unit 1425, and the key table storage unit 1427 mentioned above are implemented using the hardware resource (for example, FIG. 38).

FIG. 15 illustrates an example of an attacking trace table. The attacking trace table in this example includes a record (hereinafter, referred to as trace record) corresponding to an attacking trace. The trace record includes a field in which an identifier of an attacking terminal is set, a field in which an abused user account is set, a field in which an identifier of an abused tool 1001 is set, a field in which an identifier of a targeted terminal is set, and a field in which execution date/time is set.

The identifier of the attacking terminal identifies a terminal 101 that is suspected of launching an attack. The abused user account is an account that is suspected of being utilized in the attack. The identifier of the abused tool 1001 identifies the tool 1001 that is suspected of being used in the attack. The identifier of the targeted terminal identifies a terminal 101 that is suspected of being launched with the attack. The execution date/time is the date and time when the abused tool 1001 is executed.

An illustrated first trace record indicates that an attacker that has made a remote logon using "ACCOUNT L" from "COMPUTER A" is suspected of executing "TOOL Q", as part of cyber-attacks, of the terminal 101*e* that is "COMPUTER E", on date/time "T1".

Similarly, a second trace record indicates that an attacker that has made a remote logon using "ACCOUNT L" from "COMPUTER B" is suspected of executing "TOOL Q", as part of cyber-attacks, of the terminal 101*f* that is "COMPUTER F", on date/time "T2".

Similarly, a third trace record indicates that an attacker that has made a remote logon using "ACCOUNT L" from "COMPUTER C" is suspected of executing "TOOL Q", as part of cyber-attacks, of the terminal 101*g* that is "COMPUTER G", on date/time "T4".

Similarly, a fourth trace record indicates that an attacker that has made a remote logon using "ACCOUNT M" from "COMPUTER C" is suspected of executing "TOOL R", as part of cyber-attacks, of the terminal 101*g* that is "COMPUTER G", on date/time "T6".

Similarly, a fifth trace record indicates that an attacker that has made a remote logon using "ACCOUNT M" from "COMPUTER D" is suspected of executing "TOOL S", as part of cyber-attacks, of the terminal 101*h* that is "COMPUTER H", on date/time "T7".

Similarly, a sixth trace record indicates that an attacker that has made a remote logon using "ACCOUNT N" from "COMPUTER D" is suspected of executing "TOOL S", as part of cyber-attacks, of the terminal 101*i* that is "COMPUTER I", on date/time "T8".

FIG. 16 illustrates an example of the first key table 401. The first key table 401 in this example includes a record (hereinafter, referred to as key record) corresponding to a first search key. The key record of the first key table 401 includes a field in which a first search key is set, a field in which a new flag is set, and a field in which an effective flag is set.

The first search key is "IDENTIFIER OF ATTACKING TERMINAL" serving as a condition for searching attacking traces. The new flag remains in ON state until the completion of processing of comparing the first search key with all the execution records in all the tool execution logs 301. Further, at a point when the processing is shifted in a next cycle, the new flag is shifted in OFF state. Moreover, the effective flag is set to ON when the key record is effective as the first search key.

FIG. 16 illustrates a state after the end of search on attacking traces by comparison with "COMPUTER A", "COMPUTER B", "COMPUTER C", and "COMPUTER D".

FIG. 17 illustrates an example of the second key table 403. The second key table 403 in this example includes a record (hereinafter, referred to as key record) corresponding to a second search key. The key record of the second key table 403 includes a field in which a second search key is set, a field in which a new flag is set, and a field in which an effective flag is set.

The second search key is "ABUSED USER ACCOUNT" serving as a condition for searching the attacking traces. The new flag remains in ON state until the completion of processing of comparing the second search key with all the execution records in all the tool execution logs 301. Further, at a point when the processing is shifted in a next cycle, the new flag is shifted in OFF state. Moreover, the effective flag is set to ON when the key record is effective as the second search key.

FIG. 17 illustrates a state where a search for an attacking trace by the comparison with "ACCOUNT L", "ACCOUNT M", and "ACCOUNT N" has ended.

FIG. 18 illustrates an example of the third key table 405. The third key table 405 in this example includes a record (hereinafter, referred to as key record) corresponding to a third search key. The key record of the third key table 405 includes a field in which a third search key is set, a field in which a new flag is set, and a field in which an effective flag is set.

The third search key is "IDENTIFIER OF ABUSED TOOL" serving as a condition for searching the attacking traces. The new flag remains in ON state until the completion of processing of comparing the third search key with all the execution records in all the tool execution logs 301. Further, at a point when the processing is shifted in a next cycle, the new flag is shifted in OFF state. Moreover, the effective flag is set to ON when the key record is effective as the third search key.

FIG. 18 illustrates a state where a search for an attacking trace by the comparison with "TOOL Q", "TOOL R", and "TOOL S" has ended.

Figure 19:
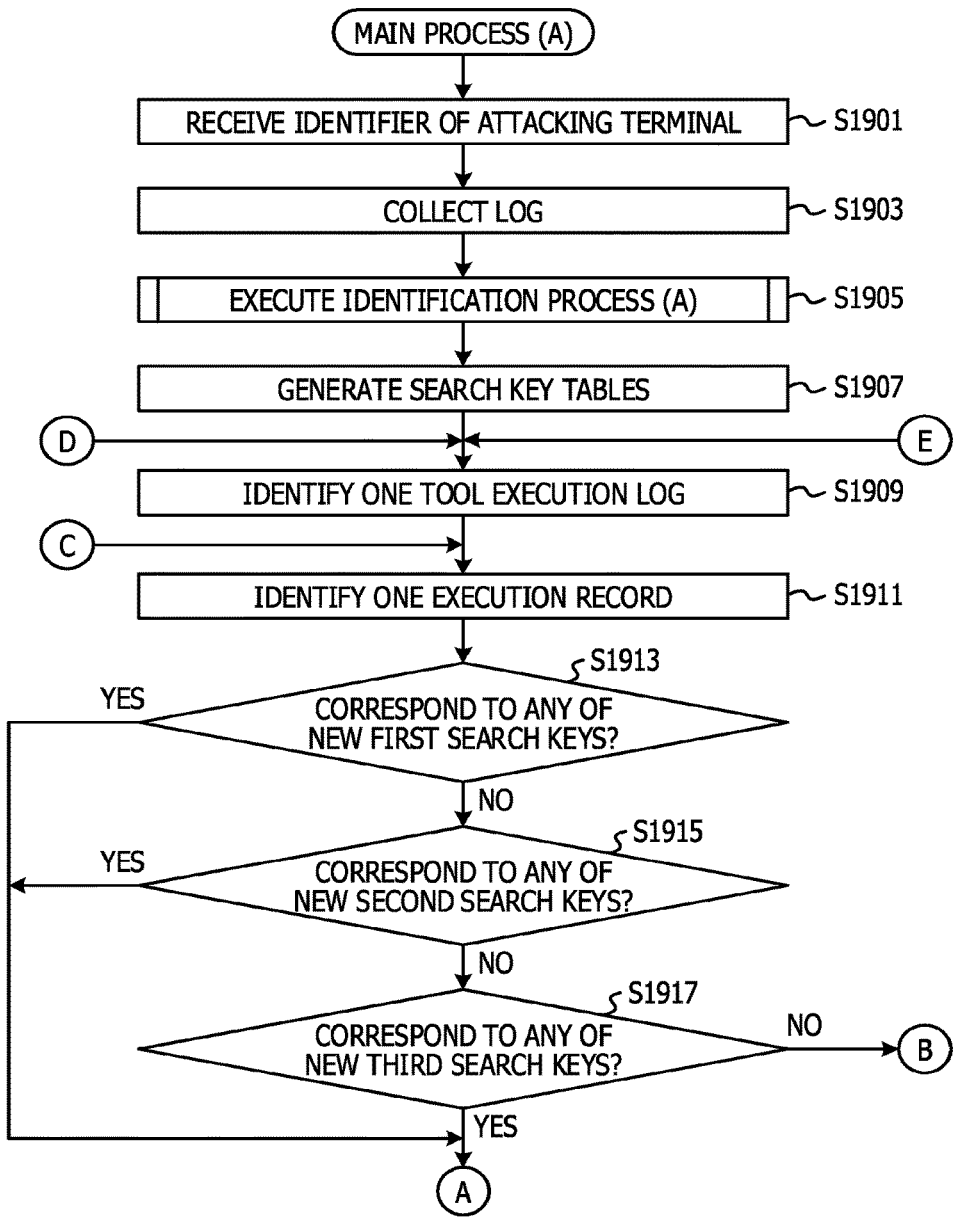
FIG. 19 is a flowchart illustrating a flow of a main process (A)

Next, processing in the analysis device 105 will be described. FIG. 19 illustrates a flow of a main process (A). The reception unit 1401 waits, and receives an identifier of an attacking terminal that is detected by the detection device 103 (S1901). The collection unit 1403 collects an event log and the tool execution log 301 from each terminal 101 (S1903). The event log storage unit 1007 stores therein each collected event log with which an identifier of the terminal 101 that having generated the event log is assigned. The execution log storage unit 1009 stores therein each collected tool execution log 301 with which an identifier of the terminal 101 having generated the tool execution log 301 is assigned.

The identification unit 1405 executes an identification process (A) (S1905). In the identification process (A), based on the identifier of the attacking terminal that is detected by the detection device 103, a primary attacking trace included in the tool execution log 301 is identified.

Figure 20:
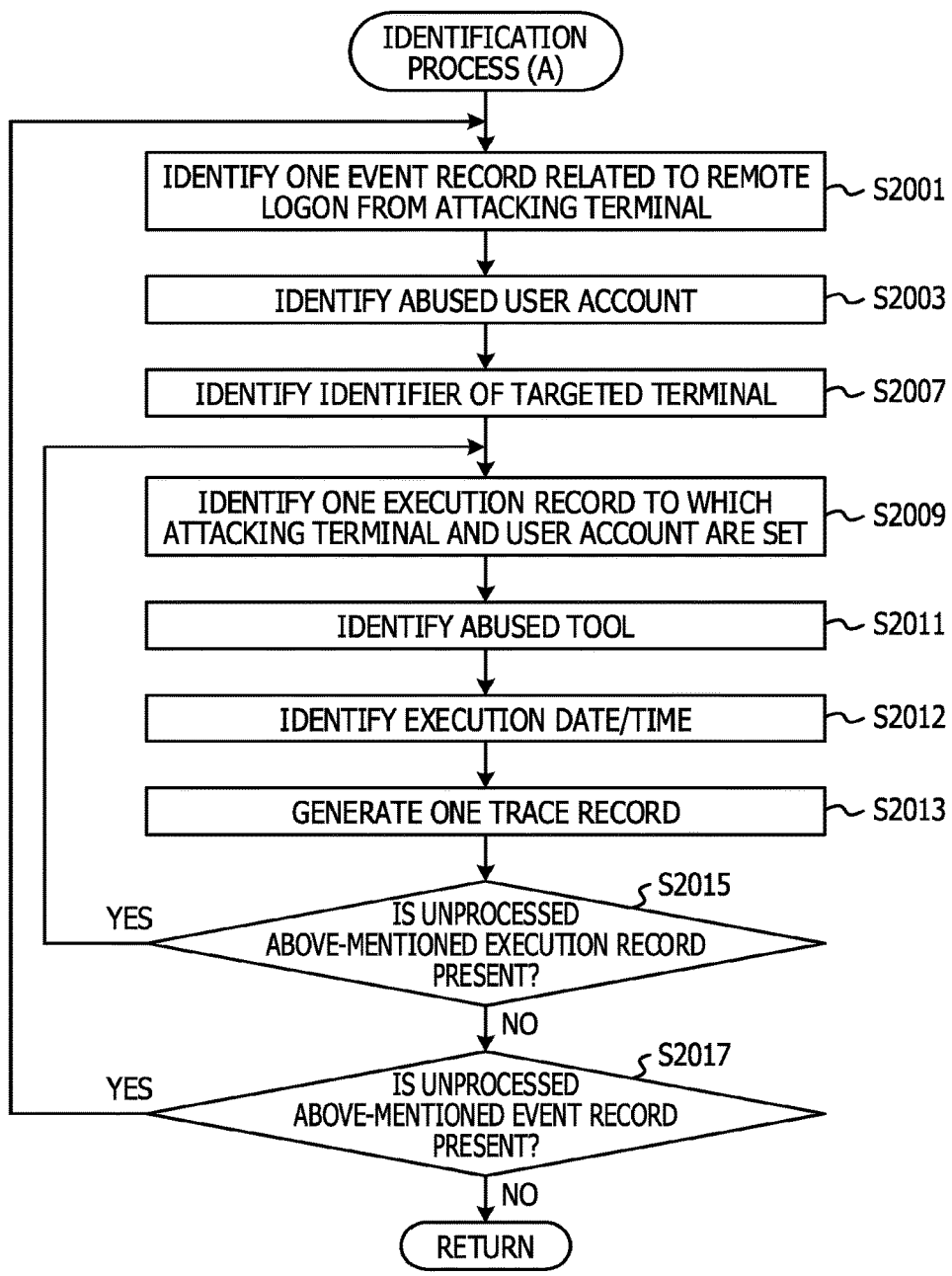
FIG. 20 is a flowchart illustrating a flow of an identification process (A)

FIG. 20 illustrates a flow of the identification process (A). The identification unit 1405 identifies one event record related to a remote logon from the attack-side terminal 101, in each collected event log (S2001).

The identification unit 1405 identifies a user account that is suspected of being abused (hereinafter, simply treated as abused user account) (S2003). Specifically, the abused user account corresponds to an account name that is set to the event record having identified in the processing illustrated at S2001.

The identification unit 1405 identifies an identifier of a terminal 101 (hereinafter, treated as targeted terminal) that is suspected of being targeted (S2007). Specifically, the identifier of the targeted terminal corresponds to an identifier of the terminal 101 that is assigned to the event log including the event record having identified in the processing illustrated at S2001.

The identification unit 1405 identifies one execution record to which the attacking terminal and the user account having identified at S2003 are corresponded in each collected tool execution log 301 (S2009). Specifically, the identification unit 1405 searches out one execution record in which the identifier of the attacking terminal is set in the field of the identifier of the logon request source, and the user account is set in the field of the user account in the remote logon.

The identification unit 1405 identifies the tool 1001 that is suspected of being abused (hereinafter, simply treated as abused tool 1001) (S2011). Specifically, the abused tool 1001 is identified by the identifier of the execution tool that is set to the execution record having identified in the processing illustrated at S2009.

The identification unit 1405 identifies the execution date/time that is set to the execution record having identified in the processing illustrated at S2001 (S2012).

Further, the identification unit 1405 generates one trace record (S2013). The identifier of the attacking terminal, the abused user account, the identifier of the abused tool, the identifier of the targeted terminal, and the execution date/time are set in the trace record.

The identification unit 1405 determines whether an execution record to be identified at S2009 is further present (S2015). If determining that an execution record to be identified at S2009 is further present, the identification unit 1405 returns the process to the processing illustrated at S2009, and repeats the above-mentioned processing.

If determining that no execution record to be identified at S2009 is present, the identification unit 1405 determines whether an event record to be identified at S2001 is further present (S2017). If determining that an event record to be identified at S2001 is further present, the identification unit 1405 returns the process to the processing illustrated at S2001, and repeats the above-mentioned processing.

If the identification unit 1405 determines that no event record to be identified at S2001 is present, the identification unit 1405 returns the process to the main process (A) illustrated in FIG. 19.

The description returns to the explanation for FIG. 19. The generation unit 1407 generates search key tables (S1907). In this example, the first key table 401, the second key table 403, and the third key table 405 correspond to the search key tables.

Specifically, the generation unit 1407 extracts an identifier of an attacking terminal that is set to a trace record having generated in the identification process (A), and registers the identifier of the attacking terminal in the first key table 401. The identifier of the attacking terminal that is registered in the first key table 401 is used as a first search key. The new flag corresponding to the new first search key is set to ON, and similarly, the effective flag corresponding thereto is set to ON.

In addition, the generation unit 1407 extracts an abused user account that is set to the trace record, and registers the abused user account in the second key table 403. The user account that is registered in the second key table 403 is used as second search key. The new flag corresponding to the new second search key is set to ON, and similarly, the effective flag corresponding thereto is set to ON.

In addition, the generation unit 1407 extracts an identifier of an abused tool that is set to the trace record, and registers the identifier of the abused tool in the third key table 405. The identifier of the tool that is registered in the third key table 405 is used as a third search key. The new flag corresponding to the new third search key is set to ON, and similarly, the effective flag corresponding thereto is set to ON.

Next, the search unit 1409 identifies one tool execution log 301 that is stored in the execution log storage unit 1423 (S1909). The search unit 1409 identifies one execution record included in the tool execution log 301 (S1911).

The search unit 1409 determines whether the identifier of the logon request source that is set to the execution record having identified at S1911 corresponds to any of new first search keys (S1913). The new first search key indicates a first search key with the corresponding new flag and effective flag being set to ON.

Figure 21:
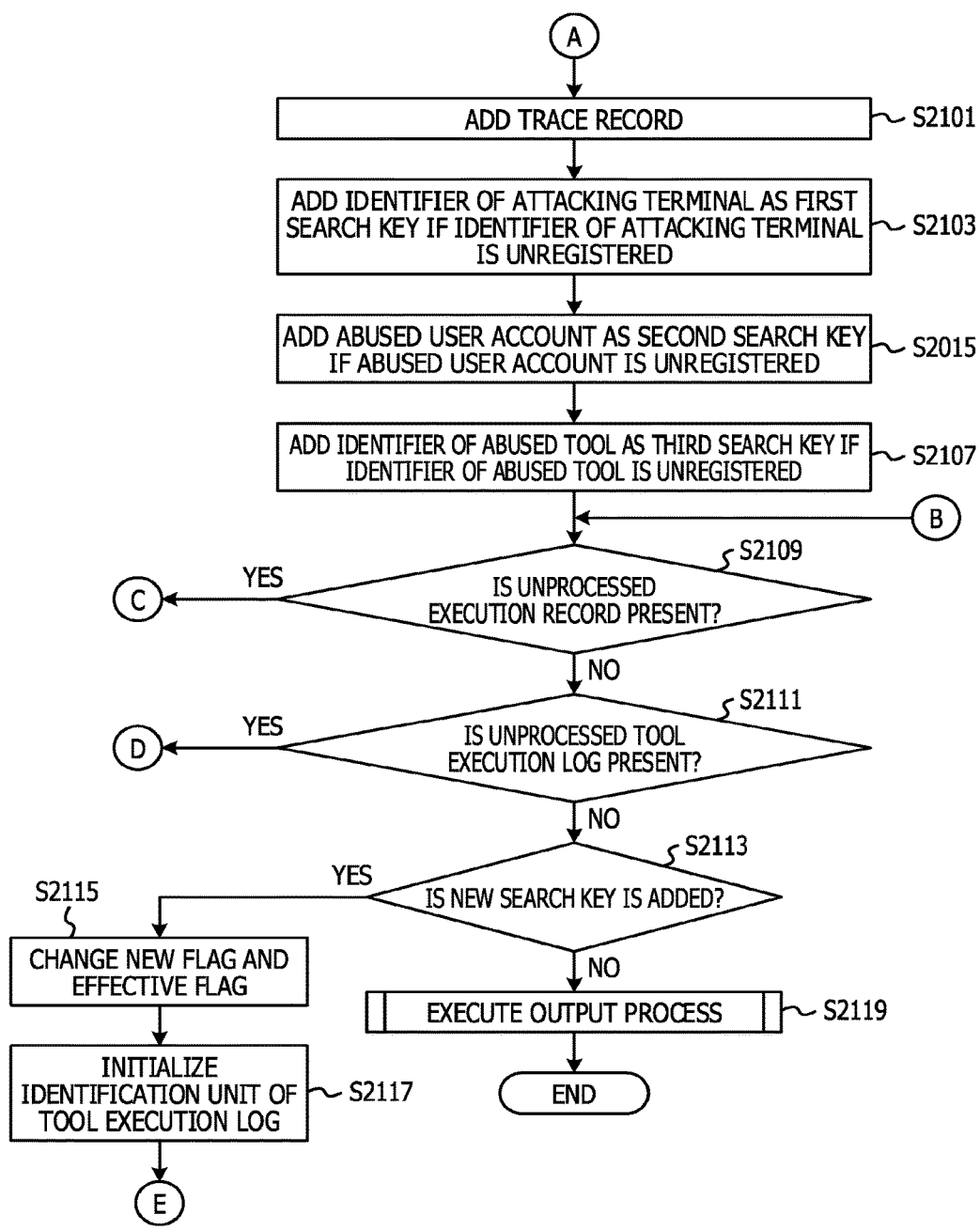
FIG. 21 is a flowchart illustrating another flow of the main process (A)

If determining that the identifier of the logon request source that is set to the execution record having identified at S1911 corresponds to any of the new first search keys, the search unit 1409 causes the process to shift to the processing illustrated at S2101 in FIG. 21 via a terminal A.

On the other hand, if determining that the identifier of the logon request source that is set to the execution record having identified at S1911 corresponds to none of the new first search keys, the search unit 1409 determines whether a user account in a remote logon that is set to the execution record corresponds to any of new second search keys (S1915). The new second search key indicates a second search key with the corresponding new flag and effective flag being set to ON.

If determining that the user account in the remote logon that is set to the execution record having identified at S1911 corresponds to any of the new second search keys, the search unit 1409 causes the process to shift to the processing illustrated at S2101 in FIG. 21 via the terminal A.

On the other hand, if determining that the user account in the remote logon that is set to the execution record having identified at S1911 corresponds to none of the new second search keys, the search unit 1409 determines whether an identifier of an execution tool that is set to the execution record corresponds to any of new third search keys (S1917). The new third search key indicates a third search key with the corresponding new flag and effective flag being set to ON.

If determining that the identifier of the execution tool that is set to the execution record having identified at S1911 corresponds to any of the new third search keys, the search unit 1409 causes the process to shift to the processing illustrated at S2101 in FIG. 21 via the terminal A.

On the other hand, if determining that the identifier of the execution tool that is set to the execution record having identified at S1911 corresponds to none of the new third search keys, the search unit 1409 causes the process to shift to the processing illustrated at S2109 in FIG. 21 via a terminal B.

The description moves to the explanation for FIG. 21. If causing the process to shift to the processing illustrated at S2101 via the terminal A, the search unit 1409 adds a trace record to the attacking trace table. Specifically, the search unit 1409 sets the identifier of the logon request source that is set to the execution record having identified at S1911 in the field of the identifier of the attacking terminal in a new trace record.

In addition, the search unit 1409 sets the user account in the remote logon that is set to the execution record in the field of the abused user account in the new trace record.

In addition, the search unit 1409 sets the identifier of the execution tool that is set to the execution record in the field of the identifier of the abused tool in the new trace record.

In addition, the search unit 1409 sets the identifier of the terminal 101 that is assigned to the tool execution log 301 having identified at S1909 in the field of the identifier of the targeted terminal in the new trace record.

In addition, the search unit 1409 sets the execution date/time that is set to the execution record in the field of the execution date/time in the new trace record.

If the identifier of the attacking terminal having set at S2101 is unregistered to the first key table 401, the addition unit 1411 adds the identifier of the attacking terminal as a first search key to the first key table 401 (S2103). The new flag corresponding to the new first search key is set to ON, and similarly, the effective flag corresponding thereto is set to OFF.

If the user account having set at S2101 is unregistered to the second key table 403, the addition unit 1411 adds the user account as a second search key to the second key table 403 (S2105). The new flag corresponding to the new second search key is set to ON, and similarly, the effective flag corresponding thereto is set to OFF.

If the identifier of the tool having set at S2101 is unregistered to the third key table 405, the addition unit 1411 adds the identifier of the tool as a third search key to the third key table 405 (S2107). The new flag corresponding to the new third search key is set to ON, and similarly, the effective flag corresponding thereto is set to OFF.

The search unit 1409 determines whether an execution record to be identified in the processing illustrated at S1911 in FIG. 19 is further present (S2109). If determining that an execution record is further present, the search unit 1409 returns the process to the processing illustrated at S1911 in FIG. 19 via a terminal C, and repeats the above-mentioned processing.

On the other hand, if determining that no the execution record is present, the search unit 1409 determines whether the tool execution log 301 to be identified in the processing illustrated at S1909 in FIG. 19 is present (S2111). If determining that the tool execution log 301 is further present, the search unit 1409 returns the process to the processing illustrated at S1909 in FIG. 19 via a terminal D, and repeats the above-mentioned processing.

If determining that no tool execution log 301 is present, the search unit 1409 determines whether a new search key is added in the loop processing illustrated from S1909 in FIG. 19 to S2111 in FIG. 21 (S2113). Specifically, if a key record with the new flag being ON and the effective flag being OFF is present in the first key table 401, the second key table 403, or the third key table 405, the search unit 1409 determines that a new search key is added. If the above-mentioned key record is present in none of the first key table 401, the second key table 403, and the third key table 405, the search unit 1409 determines that no new search key is added.

If determining that a new search key is added in the loop processing illustrated from S1909 in FIG. 19 to S2111 in FIG. 21, the search unit 1409 changes the new flag and the effective flag to be OFF with respect to the key record with the new flag being ON and the effective flag being ON. In addition, the search unit 1409 changes the effective flag to be ON with respect to the key record with the new flag being ON and the effective flag being OFF (S2115). Subsequently, the search unit 1409 initializes an identification unit of the tool execution log 301 (for example, a pointer for successively identifying the tool execution logs 301) (S2117). This allows each tool execution log 301 to be identified in the processing illustrated at S1909 in FIG. 19. Subsequently, the search unit 1409 returns the process to the processing illustrated at S1909 in FIG. 19 via a terminal E, and repeats the above-mentioned processing. In other words, before no new search key is added, each execution record in each tool execution log 301 is identified, and the processing illustrated at S1913 in FIG. 19 to S2107 in FIG. 21 is repeatedly performed.

On the other hand, if the search unit 1409 determines that no above-mentioned new search key is added at S2113, the output unit 1413 executes an output process (S2119).

Figure 22:
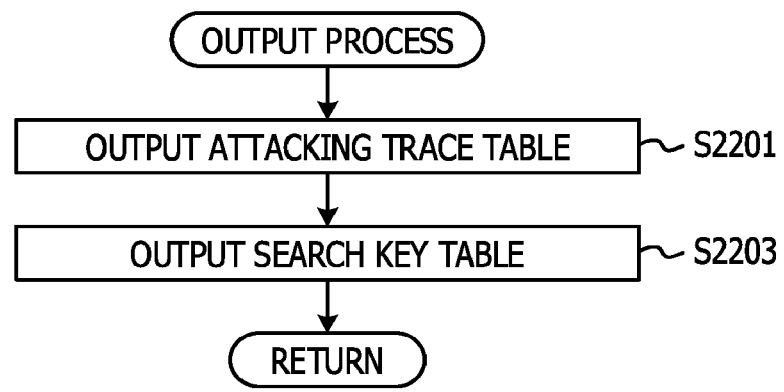
FIG. 22 is a flowchart illustrating a flow of an output process.

FIG. 22 illustrates a flow of the output process. The output unit 1413 outputs an attacking trace table (S2201). In addition, the output unit 1413 outputs a search key table (S2203). In this example, the first key table 401, the second key table 403, and the third key table 405 are outputted.

The output unit 1413 may preferably output either one of the attacking trace table and the search key table. In addition, the output unit 1413 may preferably output a part of the first key table 401, the second key table 403, and the third key table 405. Moreover, the form of output is arbitrary. For example, the output may preferably be performed by transmitting, writing in a recording medium, displaying, or printing.

With the present embodiment, it is possible to narrow down the tool execution logs 301 to be checked to analyze damages caused by a cyber-attack.

In addition, it is further possible to extract an execution record related to a remote operation by the same attacking terminal.

In addition, it is further possible to extract execution records related to a series of attacks in which the same user account is repeatedly used.

In addition, it is further possible to extract execution records related to a series of attacks which aims at operating the same tool.

Second Embodiment

Although an example of analysis based on a log generated in each terminal 101 has been explained in the above-mentioned embodiment, an example of analysis based on a task registration log generated by a device that monitors a communication via the LAN will be described in the present embodiment.

Figure 23:
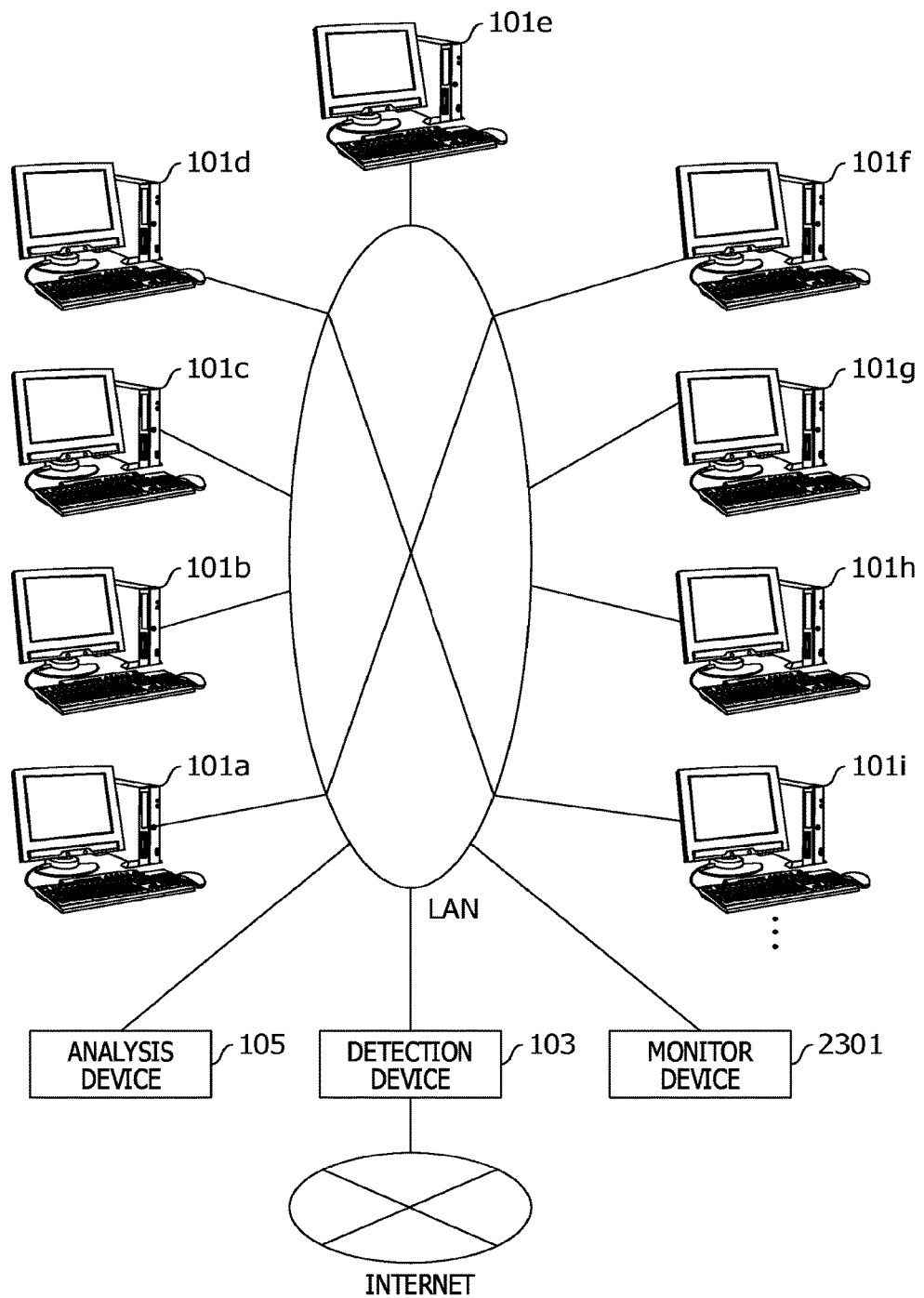
FIG. 23 is a diagram illustrating an example of an information processing system according to a second embodiment.

FIG. 23 illustrates an example of an information processing system according to a second embodiment. In the present embodiment, a monitor device 2301 is connected to the LAN. The monitor device 2301 collects packets, and generates a network log. The network log in the present embodiment is a task registration log in which a task is registered by a remote operation is recorded.

Figure 24:
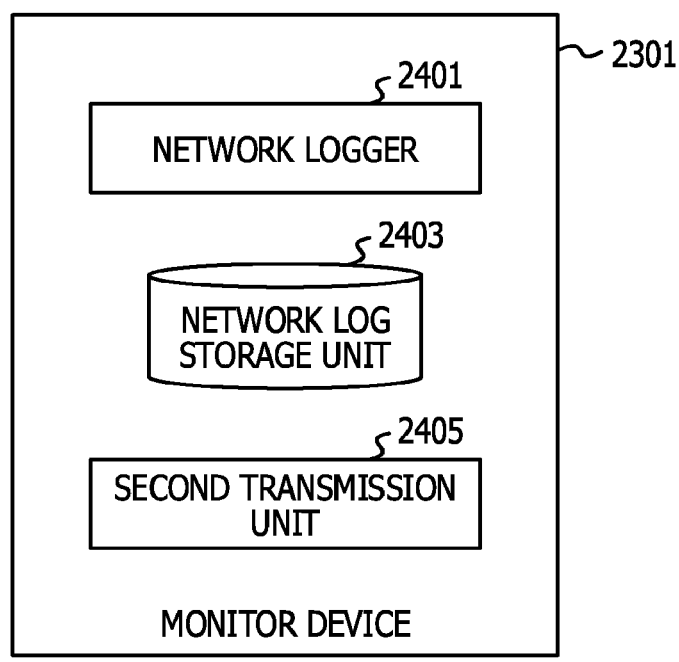
FIG. 24 is a diagram illustrating a module configuration example of a monitor device.

FIG. 24 illustrates a module configuration example of the monitor device 2301. The monitor device 2301 includes a network logger 2401, a network log storage unit 2403, and a second transmission unit 2405. The network logger 2401 generates a network log. The network log storage unit 2403 stores therein the network log. The second transmission unit 2405 transmits the network log to the analysis device 105.

The above-mentioned second transmission unit 2405 is implemented using the hardware resource (for example, FIG. 38), and a program that causes the processor to execute a process described below.

The above-mentioned network log storage unit 2403 is implemented using the hardware resource (for example, FIG. 38).

FIG. 25 illustrates an example of a task registration log. The task registration log in this example has a table form. Note that, the task registration log may preferably have a form other than the table form. The task registration log in this example includes a record (hereinafter, referred to as task record) corresponding to the registration of a task. The task record includes a field in which a transmission source IP address is set, a field in which an account name is set, a field in which a task path is set, a field in which a destination IP address is set, and a field in which registration date/time is set.

The transmission source IP address is an IP address of a terminal 101 that transmits a packet for performing task registration by the remote operation. The terminal 101 corresponds to the attack-side terminal 101. The account name identifies a user account that is used in the task registration by the remote operation. The task path identifies a task that is a registration target. The destination IP address is an IP address of a terminal 101 that receives the packet for performing the task registration by the remote operation, in other words, of a terminal 101 that performs the task registration. The terminal 101 corresponds to the target-side terminal 101. The registration date/time is date and time when the task registration is performed.

An illustrated first task record indicates that the terminal 101e with an IP address "x.x.x.5" having received a packet for performing the task registration by the remote operation from the terminal 101a with an IP address "x.x.x.1", registers a task with a task path "c:qware.exe" based on a user account "adminL" on date/time "T11".

Similarly, a second task record indicates that the terminal 101f with an IP address "x.x.x.6" having received a packet for performing the task registration by the remote operation from the terminal 101b with an IP address "x.x.x.2", registers a task with a task path "d:qware.exe" based on a user account "adminL" on date/time "T12".

Similarly, a third task record indicates that the terminal 101g with an IP address "x.x.x.7" having received a packet for performing the task registration by the remote operation from the terminal 101c with an IP address "x.x.x.3", registers a task with a task path "c:qware.exe" based on a user account "adminL" on date/time "T13".

Figure 26:
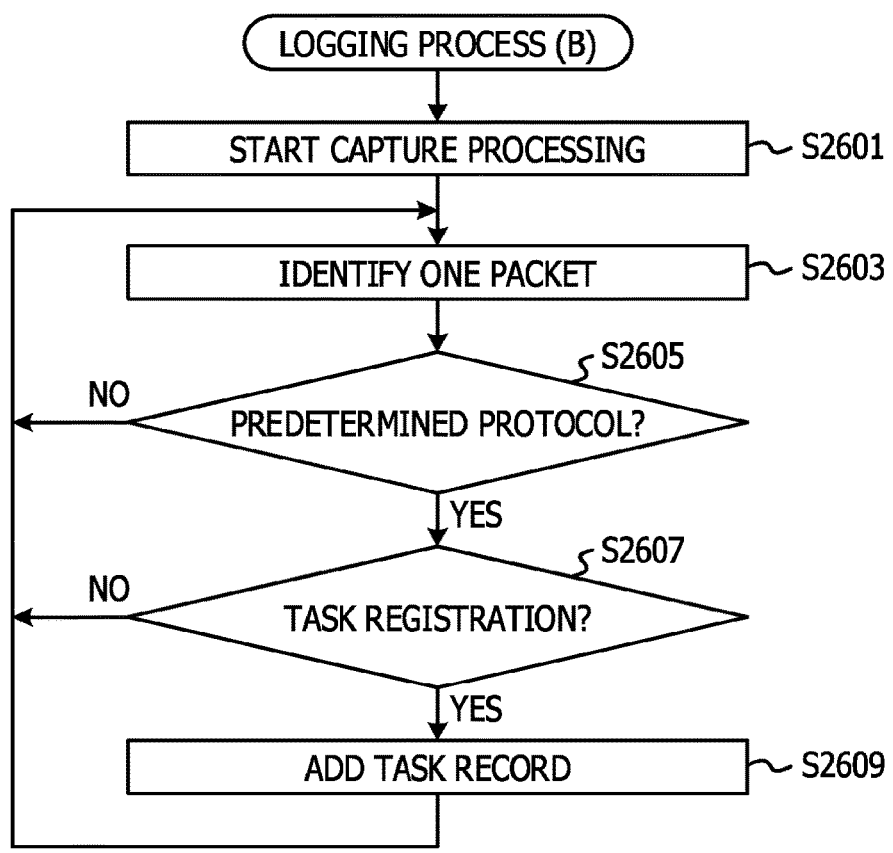
FIG. 26 is a flowchart illustrating a flow of a logging process (B)

In the present embodiment, a logging process (B) is performed. FIG. 26 illustrates a flow of the logging process (B). The network logger 2401 starts capture processing (S2601). In the capture processing, the network logger 2401 captures packets being transmitted on the network via a port mirroring capable switch or a network tap that is provided between the monitor device 2301 and the LAN. The network logger 2401 temporarily stores therein the captured packets. A packet to be stored may preferably be assigned with the date/time when the packet is captured.

The network logger 2401 identifies one unprocessed packet out of the captured packets (S2603). The network logger 2401 identifies packets in the order of capturing, for example. If no unprocessed packet is present, the network logger 2401 waits until a next packet is captured.

The network logger 2401 determines whether the identified packet is a packet of a predetermined protocol (for example, server message block (SMB) 2) (S2605). If determining that the identified packet is not a packet of a predetermined protocol, the network logger 2401 returns the process to the processing illustrated at S2603, and repeats the above-mentioned processing.

On the other hand, if determining that the identified packet is a packet of a predetermined protocol, the network logger 2401 determines whether a command in the packet is task registration (S2607). If determining that a command in the packet is not task registration, the network logger 2401 returns the process to the processing illustrated at S2603, and repeats the above-mentioned processing.

On the other hand, if determining that a command in the packet is task registration, the network logger 2401 adds a task record to the task registration log (S2609). Specifically, the network logger 2401 extracts and sets a transmission source IP address, an account name, a task path, and a destination IP address from the packet and to the corresponding fields. Moreover, the current date and the current time are set to the field of the registration date/time. Further, the network logger 2401 returns the process to the processing illustrated at S2603, and repeats the above-mentioned processing.

Figure 27:
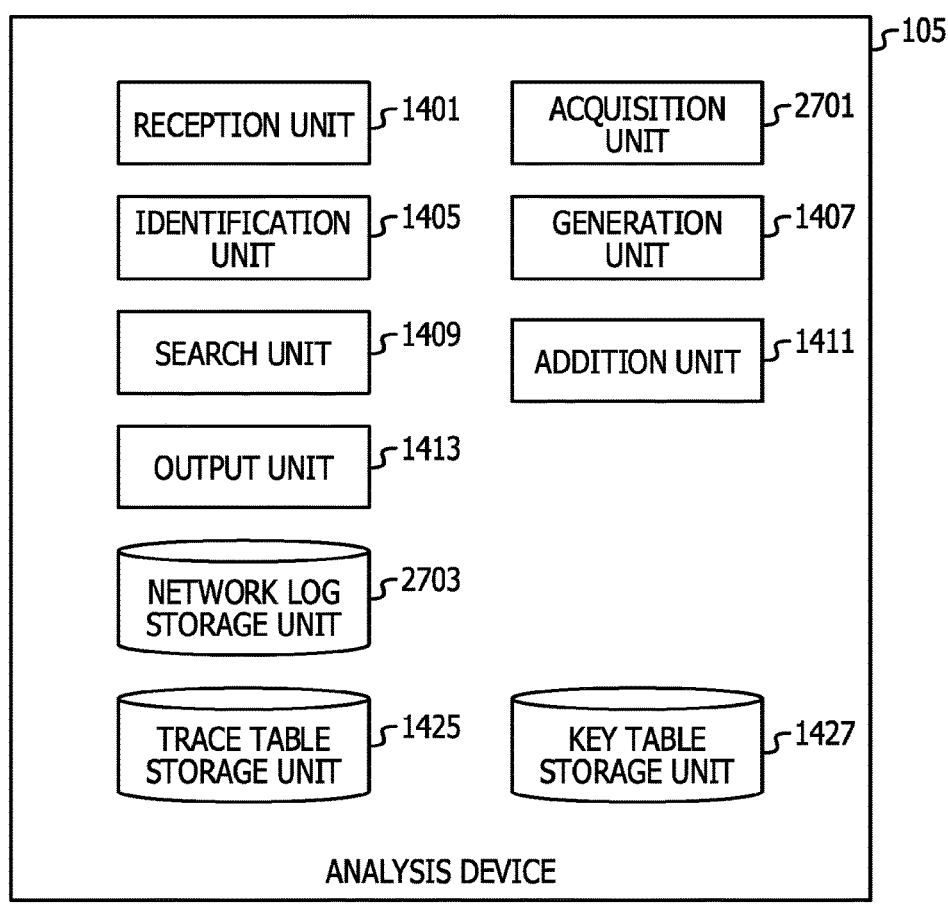
FIG. 27 is a diagram illustrating a module configuration example of an analysis device in the second embodiment.

FIG. 27 illustrates a module configuration example the analysis device 105 in the second embodiment. The analysis device 105 includes an acquisition unit 2701, instead of the collection unit 1403 illustrated in FIG. 14. The analysis device 105 includes a network log storage unit 2703, instead of the event log storage unit 1421 and the execution log storage unit 1423, which are illustrated in FIG. 14.

The acquisition unit 2701 acquires a network log. The network log storage unit 2703 stores therein the network log.

The above-mentioned acquisition unit 2701 is implemented using the hardware resource (for example, FIG. 38), and a program that causes the processor to execute a process described below.

The above-mentioned network log storage unit 2703 is implemented using the hardware resource (for example, FIG. 38).

FIG. 28 illustrates an example of an attacking trace table in the second embodiment. The identifier of the attacking terminal identifies a terminal 101 that is suspected of launching an attack. The abused user account is an account that is suspected of being used in the attack. The identifier of the abused task identifies a task that is suspected of being used for the attack. The identifier of the targeted terminal identifies a terminal 101 that is suspected of being launched with the attack. The registration date/time is the date and the time when the task is registered.

An illustrated first trace record indicates that in the target-side terminal 101e with an IP address "x.x.x.5" having received a packet for performing the task registration by the illegal remote operation from the attack-side terminal 101a with an IP address "x.x.x.1", a task with a task path "c:qware.exe" is suspected of being illegally registered based on a user account "adminL", on the date/time "T11".

An illustrated second trace record indicates that in the target-side terminal 101f with an IP address "x.x.x.6" having received a packet for performing the task registration by the illegal remote operation from the attack-side terminal 101b with an IP address "x.x.x.2", a task with a task path "d:qware.exe" is suspected of being illegally registered based on a user account "adminL", on the date/time "T12".

An illustrated third trace record indicates that in the target-side terminal 101g with an IP address "x.x.x.7" having received a packet for performing the task registration by the illegal remote operation from the attack-side terminal 101c with an IP address "x.x.x.3", a task with a task path "c:qware.exe" is suspected of being illegally registered based on a user account "adminL", on the date/time "T13".

Figure 29:
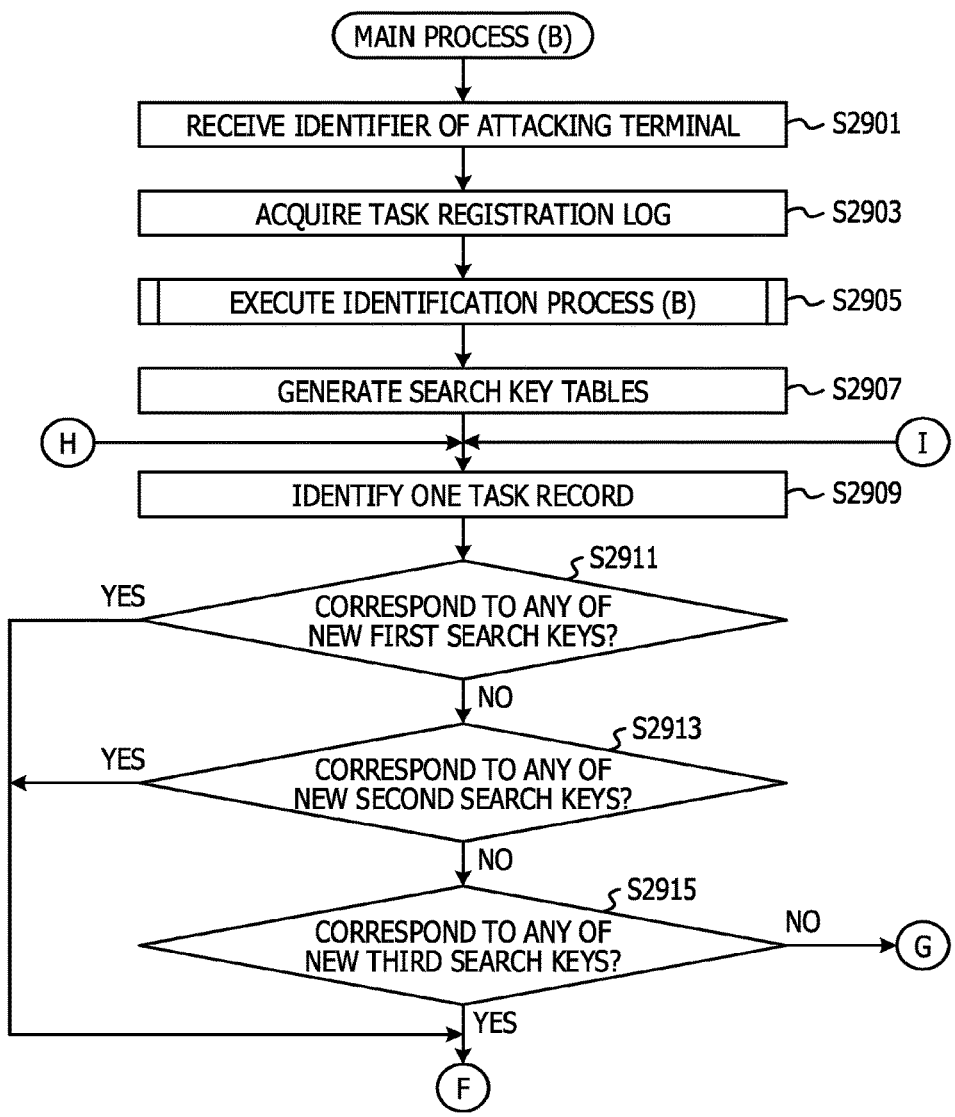
FIG. 29 is a flowchart illustrating a flow of a main process (B)

In the present embodiment, a main process (B) is performed. FIG. 29 illustrates a flow of the main process (B). The reception unit 1401 waits, and receives an identifier of an attacking terminal that is detected by the detection device 103 (S2901). The acquisition unit 2701 acquires a task registration log from the monitor device 2301 (S2903). The acquired task registration log is stored in the network log storage unit 2703.

The identification unit 1405 executes the identification process (B) (S2905). In the identification process (B), based on the identifier of the attacking terminal that is detected by the detection device 103, a primary attacking trace included in the task registration log is identified.

Figure 30:
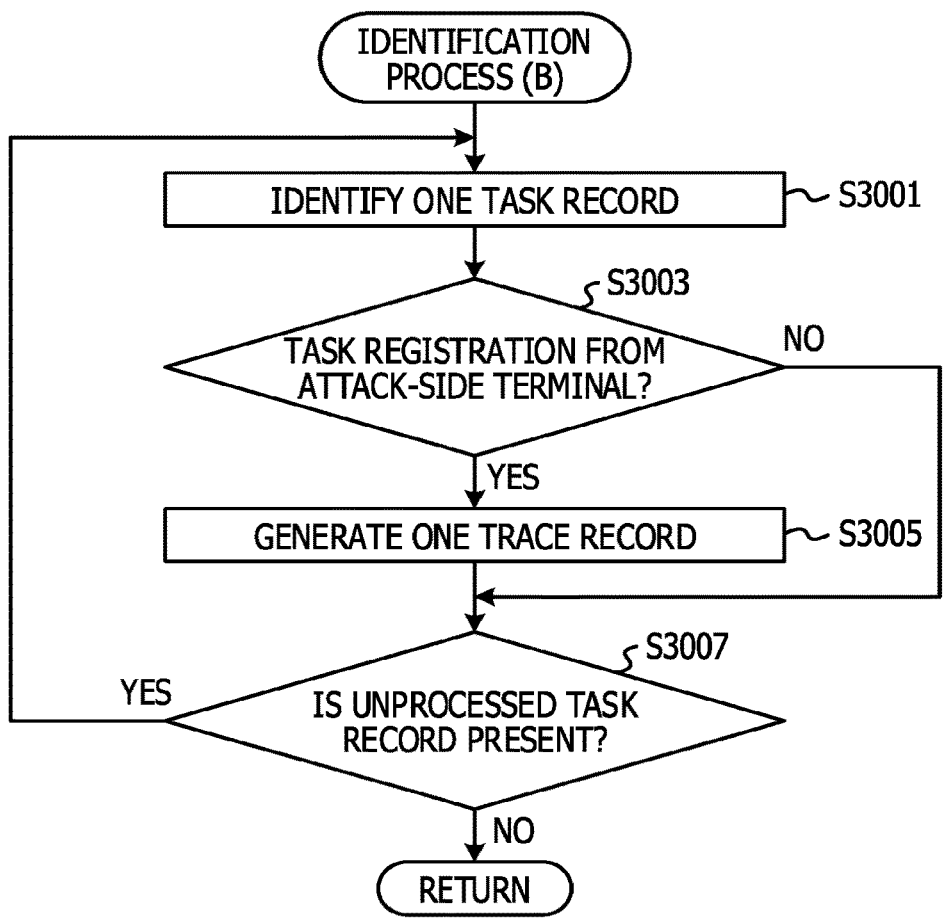
FIG. 30 is a flowchart illustrating a flow of an identification process (B)

FIG. 30 illustrates a flow of the identification process (B). The identification unit 1405 identifies one of task records included in the task registration log (S3001). The identification unit 1405 determines whether the identified task record corresponds to the task registration from the attack-side terminal 101 (S3003). Specifically, the identification unit 1405 determines that the task record corresponds to the task registration from the attack-side terminal 101 when a transmission source IP address set to the task record matches the IP address of the attack-side terminal 101.

If determining that the task record having identified at S3001 does not correspond to the task registration from the attack-side terminal 101, the identification unit 1405 causes the process to shift to the processing illustrated at S3007.

On the other hand, if determining that the task record having identified at S3001 corresponds to the task registration from the attack-side terminal 101, the identification unit 1405 generates one trace record (S3005). Specifically, the transmission source IP address set to the task record is set in the field of the identifier of the attacking terminal in the new trace record. The account name set to the task record is set in the field of the abused user account in the new trace record. The file name that is included in the task path set to the task record is set in the field of the identifier of the abused task in the new trace record. The destination IP address set to the task record is set in the field of the identifier of the targeted terminal in the new trace record. The registration date/time set to the task record is set in the field of the registration date/time in the new trace record.

The identification unit 1405 determines whether an unprocessed task record is present (S3007). If determining that an unprocessed task record is present, the identification unit 1405 returns the process to the processing illustrated at S3001, and repeats the above-mentioned processing.

On the other hand, if determining that no unprocessed task record is present, the identification unit 1405 ends the identification process (B), and returns the process to the main process (B) illustrated in FIG. 29.

The description returns to the explanation for FIG. 29. The generation unit 1407 generates a search key table similar to the case in the first embodiment (S2907).

The search unit 1409 identifies one of task records included in the task registration log (S2909).

The search unit 1409 determines whether the transmission source IP address set to the task record having identified at S2909 corresponds to any of new first search keys (S2911).

Figure 31:
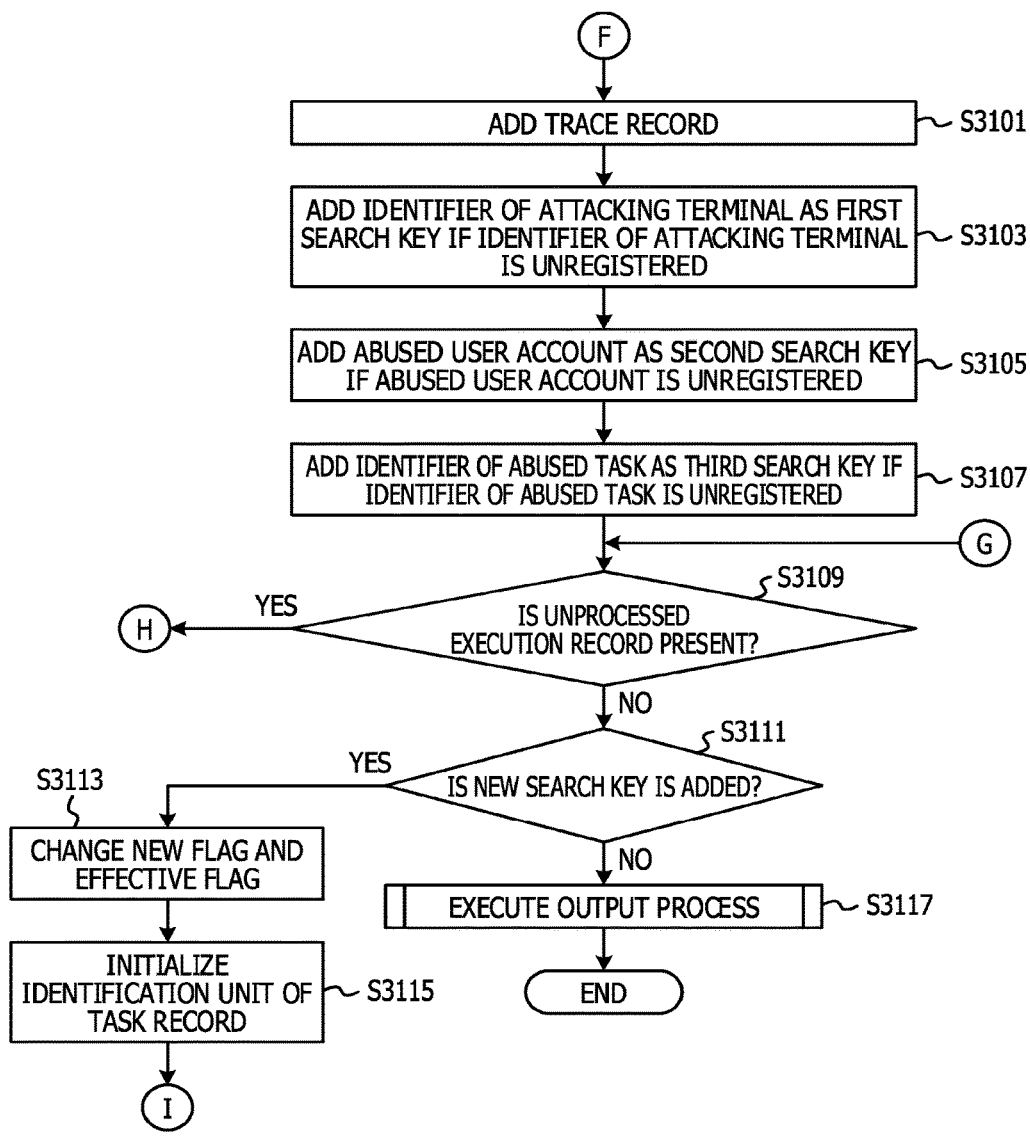
FIG. 31 is a flowchart illustrating another flow of the main process (B)

If determining that the transmission source IP address set to the task record having identified at S2909 corresponds to any of the new first search keys, the search unit 1409 causes the process to shift to the processing illustrated at S3101 in FIG. 31 via a terminal F.

On the other hand, if determining that the transmission source IP address set to the task record having identified at S2909 corresponds to none of the new first search keys, the search unit 1409 determines whether the account name set to the task record corresponds to any of new second search keys (S2913).

If determining that the account name set to the task record having identified at S2909 corresponds to any of the new second search keys, the search unit 1409 causes the process to shift to the processing illustrated at S3101 in FIG. 31 via the terminal F.

On the other hand, if determining that the account name set to the task record having identified at S2909 corresponds to none of the new second search keys, the search unit 1409 determines whether the file name that is included in the task path set to the task record corresponds to any of new third search keys (S2915).

If determining that the file name that is included in the task path set to the task record having identified at S2909 corresponds to any of the new third search keys, the search unit 1409 causes the process to shift to the processing illustrated at S3101 in FIG. 31 via the terminal F.

On the other hand, if determining that the file name that is included in the task path set to the task record having identified at S2909 corresponds to none of the new third search keys, the search unit 1409 causes the process to shift to the processing illustrated at S3109 in FIG. 31 via a terminal G.

The description moves to the explanation for FIG. 31. When the process is shifted to the processing illustrated at S3101 via the terminal F, the search unit 1409 adds a trace record to the attacking trace table. Specifically, the search unit 1409 sets the transmission source IP address set to the task record having identified at S2909 in the field of the identifier of the attacking terminal in the new trace record.

In addition, the search unit 1409 sets the account name set to the task record in the field of the abused user account in the new trace record.

In addition, the search unit 1409 sets the file name that is included in the task path set to the task record in the field of the identifier of the abused task in the new trace record.

In addition, the search unit 1409 sets the destination IP address set to the task record in the field of the identifier of the targeted terminal in the new trace record.

In addition, the search unit 1409 sets the registration date/time set to the task record in the field of the registration date/time in the new trace record.

If the identifier of the attacking terminal having set at S3101 is unregistered to the first key table 401, the addition unit 1411 adds the identifier of the attacking terminal as a first search key to the first key table 401 (S3103). The new flag corresponding to the new first search key is set to ON, and similarly, the effective flag corresponding thereto is set to OFF.

If the user account having set at S3101 is unregistered to the second key table 403, the addition unit 1411 adds the user account as a second search key to the second key table 403 (S3105). The new flag corresponding to the new second search key is set to ON, and similarly, the effective flag corresponding thereto is set to OFF.

If the identifier of the task having set at S3101 is unregistered to the third key table 405, the addition unit 1411 adds the identifier of the task as a third search key to the third key table 405 (S3107). The new flag corresponding to the new third search key is set to ON, and similarly, the effective flag corresponding thereto is set to OFF.

The search unit 1409 determines whether a task record to be identified in the processing illustrated at S2909 in FIG. 29 is further present (S3109). If determining that the task record is further present, via a terminal H, the search unit 1409 returns the process to the processing illustrated at S2909 in FIG. 29, and repeats the above-mentioned processing.

On the other hand, if determining that no task record is present, the search unit 1409 determines whether a new search key is added in the loop processing illustrated at S2909 in FIG. 29 to S3109 in FIG. 31 (S3111).

If determining that a new search key is added in the loop processing illustrated at S2909 in FIG. 29 to S3109 in FIG. 31, the search unit 1409 changes the new flag and the effective flag, similar to the case in the first embodiment (S3113). Subsequently, the search unit 1409 initializes an identification unit of the task record (for example, a pointer for successively identifying the task records) (S3115). This allows each task record to be identified in the processing illustrated at S2909 in FIG. 29. Subsequently, the search unit 1409 returns the process to the processing illustrated at S2909 in FIG. 29 via a terminal I, and repeats the above-mentioned processing. In other words, until the new search key is not added any more, task records are identified, and the processing at S2911 in FIG. 29 to S3107 in FIG. 31 is repeatedly performed.

On the other hand, if the search unit 1409 determines that no above-mentioned new search key is added at S3111, the output unit 1413 executes an output process (S3117). The output process is similar to the case in the first embodiment.

With the present embodiment, it is possible to narrow down the task registration logs to be checked to analyze damages caused by a cyber-attack.

In addition, it is further possible to extract a task registration log related to a remote operation by the same attacking terminal.

In addition, it is further possible to extract task registration logs related to a series of attacks in which the same user account is repeatedly used.

In addition, it is further possible to extract task records related to a series of attacks which aims at operating the same task.

Third Embodiment

Although an example of analysis based on the task registration log has been explained in the above-mentioned embodiment, an example of analysis based on a service registration log generated by a device that monitors a communication via the LAN will be described in the present embodiment.

The network log in the present embodiment is a service registration log in which a service is registered by the remote operation is recorded. FIG. 32 illustrates an example of a service registration log. The service registration log in this example has a table form. Note that, the service registration log may preferably have a form other than the table form. The service registration log in this example includes a record corresponding to the registration of a service (hereinafter, referred to as service record). The service record includes a field in which a transmission source IP address is set, a field in which an account name is set, a field in which a service name is set, a field in which a destination IP address is set, and a field in which registration date/time is set.

The transmission source IP address is an IP address of a terminal 101 that transmits a packet for performing service registration by the remote operation. The terminal 101 corresponds to the attack-side terminal 101. The account name identifies a user account that is used in the service registration by the remote operation. The service name identifies a service of a registration target. The destination IP address is an IP address of a terminal 101 that receives the packet for performing the service registration by the remote operation, in other words, of the terminal 101 that performs the service registration. The terminal 101 corresponds to the target-side terminal 101. The registration date/time is date and time when the service registration is performed.

An illustrated first service record indicates that the terminal 101g with an IP address "x.x.x.7" having received a packet for performing the service registration by the remote operation from the terminal 101c with an IP address "x.x.x.3", registers "serviceR" based on a user account "userM" on date/time "T21".

An illustrated second service record indicates that the terminal 101h with an IP address "x.x.x.8" having received a packet for performing the service registration by the remote operation from the terminal 101d with an IP address "x.x.x.4", registers "serviceS" based on a user account "userM" on date/time "T22".

An illustrated third service record indicates that the terminal 101i with an IP address "x.x.x.9" having received a packet for performing the service registration by the remote operation from the terminal 101d with an IP address "x.x.x.4", registers "serviceS" based on a user account "userN" on date/time "T23".

Figure 33:
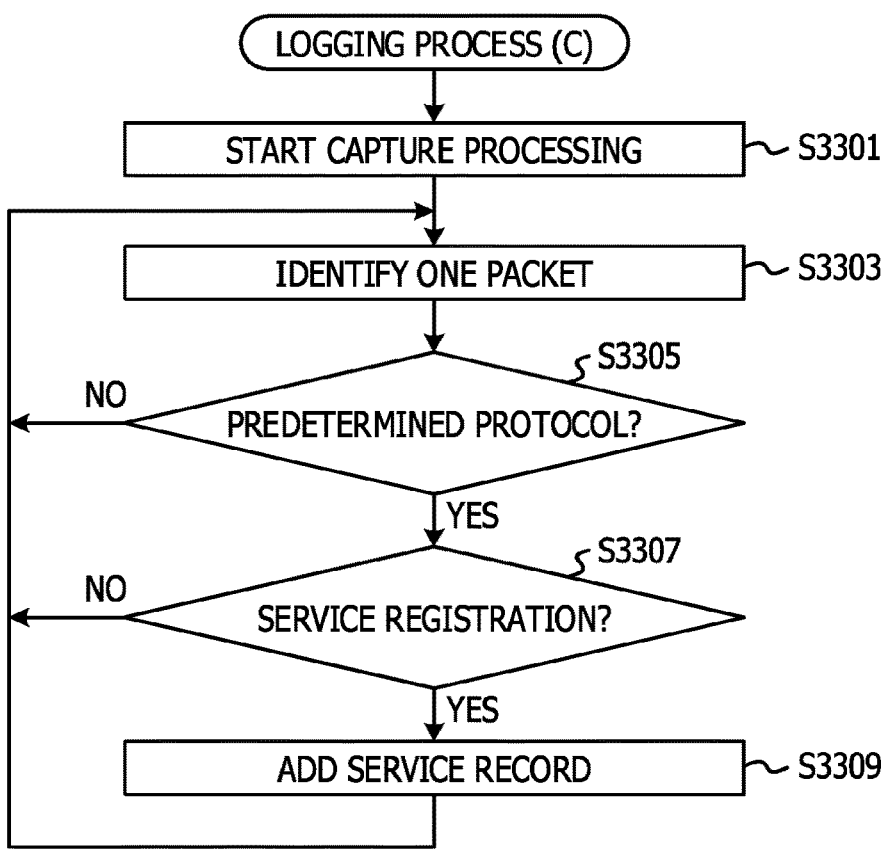
FIG. 33 is a flowchart illustrating a flow of a logging process (C)

In the present embodiment, a logging process (C) is performed. FIG. 33 illustrates a flow of the logging process (C). The network logger 2401 starts capture processing (S3301). The network logger 2401 identifies one unprocessed packet out of the captured packets (S3303).

The network logger 2401 determines whether the identified packet is a packet of a predetermined protocol (for example, distributed computing environment/remote procedure calls (DCE/RPC)) (S3305). If determining that the identified packet is not a packet of a predetermined protocol, the network logger 2401 returns the process to the processing illustrated at S3303, and repeats the above-mentioned processing.

On the other hand, if determining that the identified packet is a packet of a predetermined protocol, the network logger 2401 determines whether a command in the packet is service registration (S3307). If determining that a command in the packet is not service registration, the network logger 2401 returns the process to the processing illustrated at S3303, and repeats the above-mentioned processing.

On the other hand, if determining that a command in the packet is service registration, the network logger 2401 adds a service record to the service registration log (S3309). Specifically, the network logger 2401 extracts and sets a transmission source IP address, an account name, a service name, and a destination IP address from the packet and to the corresponding fields. Moreover, the current date and the current time are set to the field of the registration date/time. Further, the network logger 2401 returns the process to the processing illustrated at S3303, and repeats the above-mentioned processing.

FIG. 34 illustrates an example of an attacking trace table in the third embodiment. The identifier of the attacking terminal identifies a terminal 101 that is suspected of launching an attack. The abused user account is an account that is suspected of being used in the attack. An identifier of an abused service identifies a service that is suspected of being used for the attack. The identifier of the targeted terminal identifies a terminal 101 that is suspected of being launched with the attack. The registration date/time is the date and the time when the service is registered.

An illustrated first trace record indicates that in the target-side terminal 101g with an IP address "x.x.x.7" having received a packet for performing the service registration by the illegal remote operation from the attack-side terminal 101c with an IP address "x.x.x.3", "serviceR" is suspected of being illegally registered based on a user account "userM", on the date/time "T21".

Similarly, an illustrated second trace record indicates that in the target-side terminal 101h with an IP address "x.x.x.8" having received a packet for performing the service registration by the illegal remote operation from the attack-side terminal 101d with an IP address "x.x.x.4", "serviceS" is suspected of being illegally registered based on a user account "userM", on the date/time "T22".

Similarly, an illustrated third trace record indicates that in the target-side terminal 101i with an IP address "x.x.x.9" having received a packet for performing the service registration by the illegal remote operation from the attack-side terminal 101d with an IP address "x.x.x.4", "serviceS" is suspected of being illegally registered based on a user account "userN", on the date/time "T23".

Figure 35:
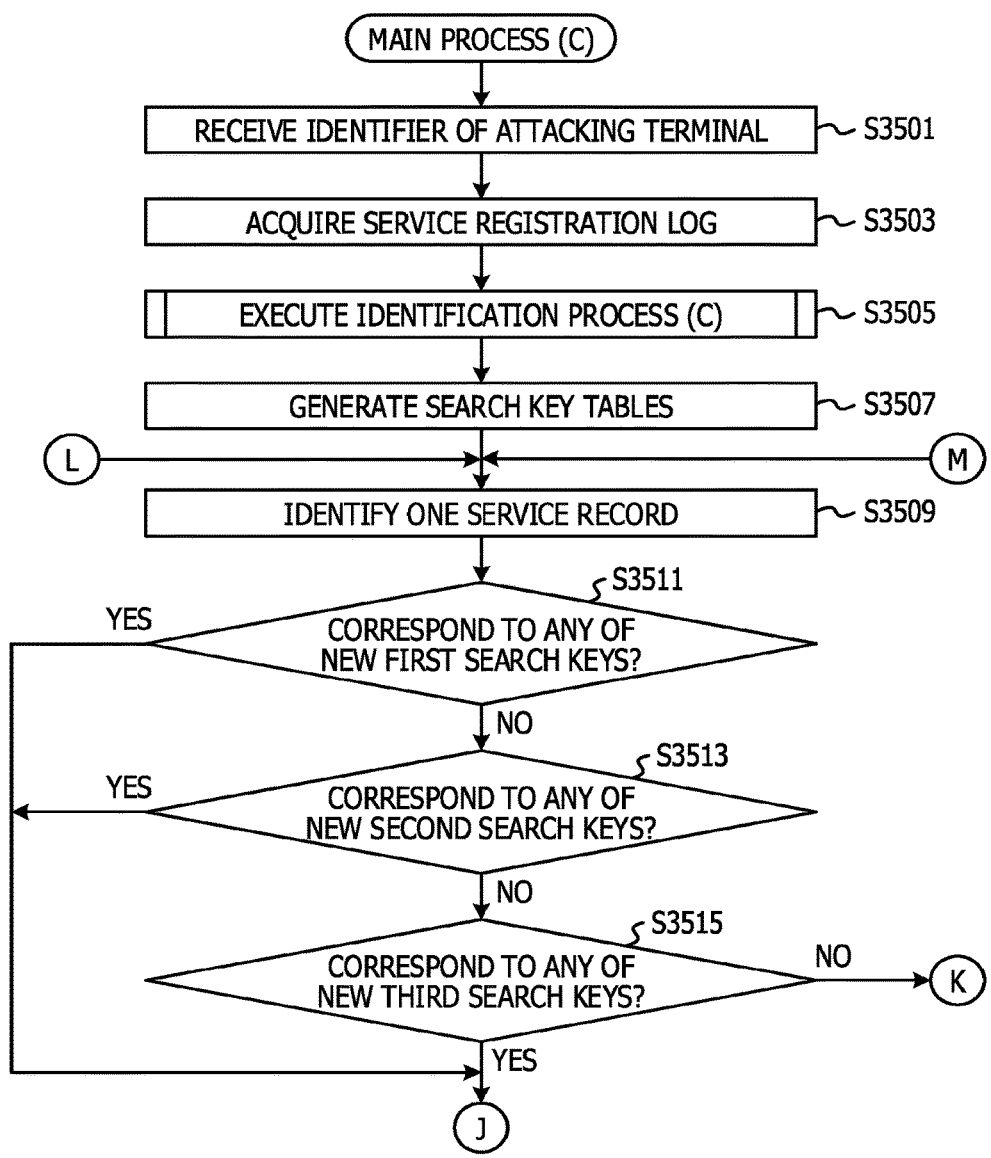
FIG. 35 is a flowchart illustrating a flow of a main process (C)

In the present embodiment, a main process (C) is performed. FIG. 35 illustrates a flow of the main process (C). The reception unit 1401 waits, and receives an identifier of an attacking terminal that is detected by the detection device 103 (S3501). The acquisition unit 2701 acquires a service registration log from the monitor device 2301 (S3503). The acquired service registration log is stored in the network log storage unit 2703.

The identification unit 1405 executes an identification process (C) (S3505). In the identification process (C), based on the identifier of the attacking terminal that is detected by the detection device 103, a primary attacking trace included in the service registration log is identified.

Figure 36:
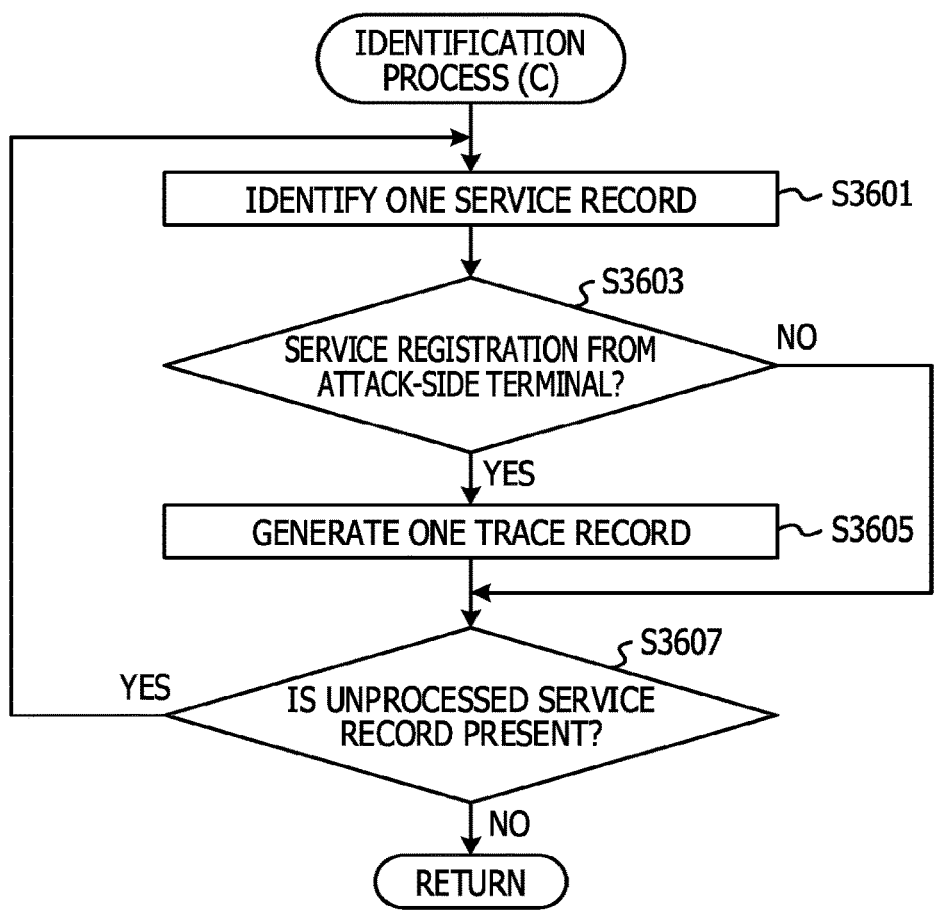
FIG. 36 is a flowchart illustrating a flow of an identification process (C)

FIG. 36 illustrates a flow of the identification process (C). The identification unit 1405 identifies one of service records included in the service registration log (S3601). The identification unit 1405 determines whether the identified service record corresponds to the service registration from the attack-side terminal 101 (S3603). Specifically, the identification unit 1405 determines that the service record corresponds to the service registration from the attack-side terminal 101 when a transmission source IP address set to the service record matches the IP address of the attack-side terminal 101.

If determining that the service record having identified at S3601 does not correspond to the service registration from the attack-side terminal 101, the identification unit 1405 causes the process to shift to the processing illustrated at S3607.

On the other hand, if determining that the service record having identified at S3601 corresponds to the service registration from the attack-side terminal 101, the identification unit 1405 generates one trace record (S3605). Specifically, the transmission source IP address set to the service record is set in the field of the identifier of the attacking terminal in the new trace record. The account name set to the service record is set in the field of the abused user account in the new trace record. The service name set to the service record is set in the field of the identifier of the abused service in the new trace record. The destination IP address set to the service record is set in the field of the identifier of the targeted terminal in the new trace record. The registration date/time set to the service record is set in the field of the registration date/time in the new trace record.

The identification unit 1405 determines whether an unprocessed service record is present (S3607). If determining that an unprocessed service record is present, the identification unit 1405 returns the process to the processing illustrated at S3601, and repeats the above-mentioned processing.

On the other hand, if determining that no unprocessed service record is present, the identification unit 1405 ends the identification process (C), and returns the process to the main process (C) illustrated in FIG. 35.

The description returns to the explanation for FIG. 35. The generation unit 1407 generates search key tables similar to the case in the first embodiment (S3507).

The search unit 1409 identifies one of service records included in the service registration log (S3509).

The search unit 1409 determines whether the transmission source IP address set to the service record having identified at S3509 corresponds to any of new first search keys (S3511).

Figure 37:
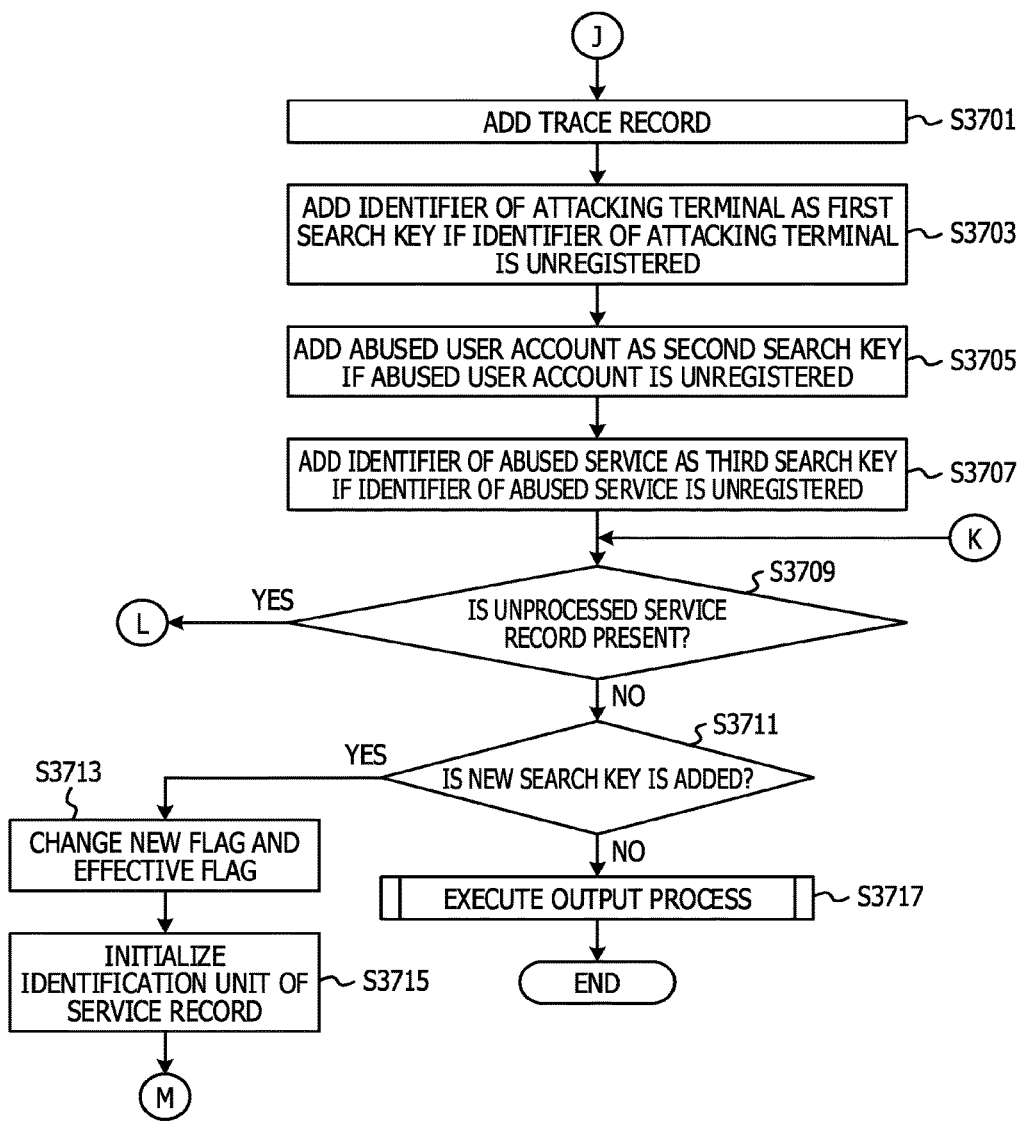
FIG. 37 is a flowchart illustrating another flow of the main process (C)

If determining that the transmission source IP address set to the service record having identified at S3509 corresponds to any of the new first search keys, the search unit 1409 causes the process to shift to the processing illustrated at S3701 in FIG. 37 via a terminal J.

On the other hand, if determining that the transmission source IP address set to the service record having identified at S3509 corresponds to none of the new first search keys, the search unit 1409 determines whether the account name set to the service record corresponds to any of new second search keys (S3513).

If determining that the account name set to the service record having identified at S3509 corresponds to any of the new second search keys, the search unit 1409 causes the process to shift to the processing illustrated at S3701 in FIG. 37 via the terminal J.

On the other hand, if determining that the account name set to the service record having identified at S3509 corresponds to none of the new second search keys, the search unit 1409 determines whether the service name set to the service record corresponds to any of new third search keys (S3515).

If determining that the service name set to the service record having identified at S3509 corresponds to any of the new third search keys, the search unit 1409 causes the process to shift to the processing illustrated at S3701 in FIG. 37 via the terminal J.

On the other hand, if determining that the service name set to the service record having identified at S3509 corresponds to none of the new third search keys, the search unit 1409 causes the process to shift to the processing illustrated at S3709 in FIG. 37 via a terminal K.

The description moves to the explanation for FIG. 37. When the process is shifted to the processing illustrated at S3701 via the terminal J, the search unit 1409 adds a trace record to the attacking trace table. Specifically, the search unit 1409 sets the transmission source IP address set to the service record having identified at S3509 in the field of the identifier of the attacking terminal in the new trace record.

In addition, the search unit 1409 sets the account name set to the service record in the field of the abused user account in the new trace record.

In addition, the search unit 1409 sets the service name set to the service record in the field of the identifier of the abused user account in the new trace record.

In addition, the search unit 1409 sets the destination IP address set to the service record in the field of the identifier of the targeted terminal in the new trace record.

In addition, the search unit 1409 sets the registration date/time set to the service record in the field of the registration date/time in the new trace record.

If the identifier of the attacking terminal having set at S3701 is unregistered to the first key table 401, the addition unit 1411 adds the identifier of the attacking terminal as a first search key to the first key table 401 (S3703). The new flag corresponding to the new first search key is set to ON, and similarly, the effective flag corresponding thereto is set to OFF.

If the user account having set at S3701 is unregistered to the second key table 403, the addition unit 1411 adds the user account as a second search key to the second key table 403 (S3705). The new flag corresponding to the new second search key is set to ON, and similarly, the effective flag corresponding thereto is set to OFF.

If the identifier of the service having set at S3701 is unregistered to the third key table 405, the addition unit 1411 adds the identifier of the service as a third search key to the third key table 405 (S3707). The new flag corresponding to the new third search key is set to ON, and similarly, the effective flag corresponding thereto is set to OFF.

The search unit 1409 determines whether a service record to be identified in the processing illustrated at S3509 in FIG. 35 is further present (S3709). If determining that the task record is further present, the search unit 1409 returns the process to the processing illustrated at S3509 in FIG. 35 via a terminal L, and repeats the above-mentioned processing.

On the other hand, if determining that no service record is present, the search unit 1409 determines whether a new search key is added in the loop processing illustrated at S3509 in FIG. 35 to S3709 in FIG. 37 (S3711).

If determining that a new search key is added in the loop processing illustrated at S3509 in FIG. 35 to S3709 in FIG. 37, the search unit 1409 changes the new flag and the effective flag, similar to the case in the first embodiment (S3713). Subsequently, the search unit 1409 initializes an identification unit of the service record (for example, a pointer for successively identifying the service records) (S3715). This allows each service record to be identified in the processing illustrated at S3509 in FIG. 35. Subsequently, the search unit 1409 returns the process to the processing illustrated at S3509 in FIG. 35 via a terminal M, and repeats the above-mentioned processing. In other words, before no new search key is added, each service record is identified, and the processing illustrated at S3511 in FIG. 35 to S3707 in FIG. 37 is repeatedly performed.

On the other hand, if the search unit 1409 determines that no above-mentioned new search key is added at S3711, the output unit 1413 executes an output process (S3717). The output process is similar to the case in the first embodiment.

With the present embodiment, it is possible to narrow down the service registration log to be checked to analyze damages caused by a cyber-attack.

In addition, it is further possible to extract a service record related to a remote operation by the same attacking terminal.

In addition, it is further possible to extract service records related to a series of attacks in which the same user account is repeatedly used.

In addition, it is further possible to extract service records related to a series of attacks which aims at operating the same service.

The embodiments of the present disclosure have been explained in the foregoing, however, the present disclosure is not limited to these embodiments. For example, the function block configuration described above may not correspond with a program module configuration in some cases.

Moreover, the configuration of each storage region explained in the foregoing is merely an example, and is not limited to thereto. In addition, in the process flows, the order of the processes may preferably be interchanged or the multiple processes may preferably be executed in parallel with one another as long as the process result is not changed.

Note that, the terminal 101, the detection device 103, the analysis device 105, and the monitor device 2301, which are described above, are computer devices, and as illustrated in FIG. 38, a memory 2501, a central processing unit (CPU) 2503, a hard disk drive (HDD) 2505, a display control unit 2507 that is connected to a display device 2509, a drive device 2513 for a removable disk 2511, an input device 2515, and a communication control unit 2517 for connecting to the network are connected to one another with a bus 2519. An operating system (OS) and an application program for conducting the processing in the embodiments are stored in the HDD 2505, and are read out into the memory 2501 from the HDD 2505 when being executed by the CPU 2503. The CPU 2503 controls the display control unit 2507, the communication control unit 2517, the drive device 2513 in accordance with the processing contents of the application program, and causes these units to perform predetermined operations. Moreover, although data in the middle of the processing is mainly stored in the memory 2501, the data may preferably be stored in the HDD 2505. In the embodiments of the present disclosure, the application program for conducting the processing described above is distributed by being stored in the computer-readable removable disk 2511, and is installed into the HDD 2505 from the drive device 2513. The application program is installed into the HDD 2505 through a network such as the Internet and the communication control unit 2517 in some cases. Such computer devices implement the various kinds of function as described above in such a manner that the hardware such as the CPU 2503 and the memory 2501 is systematically cooperated with the programs such as the OS and the application program.

The embodiments of the present disclosure described in the foregoing are summarized as follows.

The log analysis method according to the present embodiments includes: a search process (A) that searches, from a log that includes a plurality of records each including a plurality pieces of discrimination information, using the above-mentioned discrimination information of a record that is suspected of relating to the attack as a search key, a record including the search key; an addition process (B) that adds, when the record is searched, out of the above-mentioned discrimination information included in the searched record, discrimination information that does not correspond to the search key yet to a new search key; and an repeat process (C) that repeats, every time a new search key is added in the addition process, the search process and the addition process with respect to the new search key.

This makes it possible to narrow down logs to be checked to analyze damages caused by the cyber-attack.

In addition, the record may preferably include, as the above-mentioned discrimination information, an identifier of a device that has requested a remote logon, a user account that has been used in the remote logon, and an identifier of a program that is a target of a remote operation by the user account in a device in which the remote logon is made.

Moreover, of a record that is suspected of relating to an attack, at least one of an identifier of a device that is suspected of launching the attack, a user account that is suspected of being utilized for the attack, and an identifier of a program that is suspected of being used in the attack may preferably be used as a search key.

This further makes it possible to extract an execution record related to a remote operation by the same attacking terminal. This further makes it possible to extract records related to a series of attacks in which the same user account is repeatedly used. This further makes it possible to extract records related to a series of attacks which aims at operating the same program.

Note that, a program to allow a computer to execute the processes by the above-mentioned method may be created, and the program is stored in, for example, a computer readable storage medium such as a flexible disk, a CD-ROM, a magneto-optical disk, a semiconductor memory, or a hard disk, or a storage memory. Note that, a midway process result is temporarily kept in a storage memory such as a main memory in general.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An identification method executed by a computer, the identification method comprising:
   obtaining, from each of a plurality of computers, a record including a plurality of pieces of log information respectively, each of a plurality of records including a plurality of items and a plurality of values set in the plurality of items;
   executing, by using a first search key representing a first value, a first identification process that identifies a first record including the first value set in a first item from among the plurality of records;
   executing a second identification process that identifies a second value set in a second item included in the identified first record as a second search key;
   executing, by using the second search key representing the second value, a third identification process that identifies a second record including the second value set in the second item from among the plurality of records, wherein the first value is not included in the second record;
   and
   outputting information on at least one computer, from among the plurality of computers, that is suspected of a cyber-attack, based on the first record and the second record.

2. The identification method according to claim 1, wherein the plurality of items include the first item indicating an attack-side computer that requests a remote logon, the second item indicating a user account that is used in the remote logon, and a third item indicating a program that is remotely operated by the user account.

3. The identification method according to claim 2, wherein a value set in the first item is a first identifier identifying the attack-side computer that requests the remote logon,
a value set in the second item is a second identifier identifying the user account that is used in the remote logon, and
a value set in the third item is a third identifier identifying the program that is remotely operated by the user account.

4. The identification method according to claim 1, further comprising:
   receiving designation of a first computer that is suspected of launching the cyber-attack; and
   setting the first value indicating the first computer as the first search key before the first identification process.

5. The identification method according to claim 1, further comprising:
   executing a fourth identification process that identifies a third value set in a third item included in the identified second record as a third search key; and
   executing, by using the third search key representing the third value, a fifth identification process that identifies a third record including the third value set in the third item from among the plurality of records, wherein at least one of the first value and the second value is not included in the third record,
   wherein the information on the at least one computer is based on the third record.

6. A non-transitory computer-readable storage medium storing computer executable instructions that, when executed by circuitry of a computer, cause the computer to perform an identification process comprising:
   obtaining, from each of a plurality of computers, a record including a plurality of pieces of log information respectively, each of a plurality of records including a plurality of items and a plurality of values set in the plurality of items;
   executing, by using a first search key representing a first value, a first identification process that identifies a first record including the first value set in a first item from among the plurality of records;
   executing a second identification process that identifies a second value set in a second item included in the identified first record as a second search key;
   executing, by using the second search key representing the second value, a third identification process that identifies a second record including the second value set in the second item from among the plurality of records, wherein the first value is not included in the second record;
   and
   outputting information on at least one computer, from among the plurality of computers, that is suspected of a cyber-attack, based on the first record and the second record.

7. The non-transitory computer-readable storage medium according to claim 6, wherein the plurality of items include the first item indicating an attack-side computer that requests a remote logon, the second item indicating a user account that is used in the remote logon, and a third item indicating a program that is remotely operated by the user account.

8. The non-transitory computer-readable storage medium according to claim 7, wherein
   a value set in the first item is a first identifier identifying the attack-side computer that requests the remote logon, a value set in the second item is a second identifier identifying the user account that is used in the remote logon, and a value set in the third item is a third identifier identifying the program that is remotely operated by the user account.

9. The non-transitory computer-readable storage medium according to claim 6, the process further comprising:

receiving designation of a first computer that is suspected of launching the cyber-attack; and setting the first value indicating the first computer as the first search key before the first identification process.

10. The non-transitory computer-readable storage medium according to claim 6, the process further comprising:

executing a fourth identification process that identifies a third value set in a third item included in the identified second record as a third search key; and executing, by using the third search key representing the third value, a fifth identification process that identifies a third record including the third value set in the third item from among the plurality of records, wherein at least one of the first value and the second value is not included in the third record, wherein the information on the at least one computer is based on the third record.

11. An information processing device comprising:

a memory; and a processor coupled to the memory and configured to:

obtain, from each of a plurality of computers, a record including a plurality of pieces of log information respectively, each of a plurality of records including a plurality of items and a plurality of values set in the plurality of items, execute, by using a first search key representing a first value, a first identification process that identifies a first record including the first value set in a first item from among the plurality of records, execute a second identification process that identifies a second value set in a second item included in the identified first record as a second search key, execute, by using the second search key representing the second value, a third identification process that identifies a second record including the second value set in the second item from among the plurality of records, wherein the first value is not included in the second record, and output information on at least one computer, from among the plurality of computers, that is suspected of a cyber-attack, based on the first record and the second record.

12. The information processing device according to claim 11, wherein the plurality of items include the first item indicating an attack-side computer that requests a remote logon, the second item indicating a user account that is used in the remote logon, and a third item indicating a program that is remotely operated by the user account.

13. The information processing device according to claim 12, wherein a value set in the first item is a first identifier identifying the attack-side computer that requests the remote logon, a value set in the second item is a second identifier identifying the user account that is used in the remote logon, and a value set in the third item is a third identifier identifying the program that is remotely operated by the user account.

14. The information processing device according to claim 11, wherein the processor is configured to:

receive designation of a first computer that is suspected of launching the attack, and set the first value indicating the first computer as the search key before the first identification process.

15. The information processing device according to claim 11, wherein the processor is configured to execute a fourth identification process that identifies a third value set in a third item included in the identified second record as a third search key, and execute, by using the third search key representing the third value, a fifth identification process that identifies a third record including the third value set in the third item from among the plurality of records, wherein at least one of the first value and the second value is not included in the third record, and wherein the information on the at least one computer is based on the third record.

* * * * *